US012313554B2

(12) United States Patent
Ohba et al.

(10) Patent No.: US 12,313,554 B2
(45) Date of Patent: May 27, 2025

(54) LASER-INDUCED BREAKDOWN SPECTROSCOPE

(71) Applicant: Keyence Corporation, Osaka (JP)

(72) Inventors: Hayato Ohba, Osaka (JP); Kenichiro Hirose, Osaka (JP); Ryosuke Kondo, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 377 days.

(21) Appl. No.: 17/853,957

(22) Filed: Jun. 30, 2022

(65) Prior Publication Data

US 2023/0032192 A1 Feb. 2, 2023

(30) Foreign Application Priority Data

Jul. 30, 2021 (JP) ................................ 2021-126162

(51) Int. Cl.
*G01N 21/71* (2006.01)
*G01N 21/17* (2006.01)

(52) U.S. Cl.
CPC .......... *G01N 21/718* (2013.01); *G01N 21/17* (2013.01); *G01N 2021/1765* (2013.01); *G01N 2021/1782* (2013.01)

(58) Field of Classification Search
None
See application file for complete search history.

(56) References Cited

U.S. PATENT DOCUMENTS

2004/0183018 A1* 9/2004 Zhou .................... G01N 21/718 250/341.1
2009/0238222 A1* 9/2009 Dantus .............. G01B 9/02067 372/30
2012/0099103 A1* 4/2012 Hahn .................. G01N 21/718 356/316
2016/0091434 A1* 3/2016 Fagan .................. G01J 3/0208 356/318
2018/0123310 A1* 5/2018 Bhandari ............. H01S 3/1603
2022/0113530 A1* 4/2022 Hirose ................ G02B 21/362

FOREIGN PATENT DOCUMENTS

JP 2020113569 A * 7/2020

OTHER PUBLICATIONS

U.S. Appl. No. 17/466,288, filed Sep. 3, 2021 (156 pages).
U.S. Appl. No. 17/688,962, filed Mar. 8, 2022 (210 pages).
U.S. Appl. No. 17/688,968, filed Mar. 8, 2022 (123 pages).
U.S. Appl. No. 17/853,956, filed Jun. 30, 2022 (139 pages).

* cited by examiner

*Primary Examiner* — Uzma Alam
*Assistant Examiner* — Chad Andrew Reverman
(74) *Attorney, Agent, or Firm* — Kilyk & Bowersox, P.L.L.C.

(57) ABSTRACT

A change in a substance in a depth direction of an analyte is easily estimated. An analysis and observation device includes: a library holding section that holds a substance library in which a substance is associated with a type of an element constituting the substance and a content of the element; and a component analysis section that estimates a type of an element constituting a substance and a content of the element based on a spectrum, and estimates the substance based on estimated characteristics and the substance library. The component analysis section estimates a type of an element constituting a substance, a content of the element, and the substance at each of a plurality of positions having different analysis depths.

12 Claims, 17 Drawing Sheets

FIG. 13

| | Cr | Ni | Cu | Zn | SUBSTANCE | REMARKS |
|---|---|---|---|---|---|---|
| 1 | 100 | | | | Cr | |
| 2 | 100 | | | | Cr | |
| 3 | 97 | 3 | | | Cr | |
| 4 | 70 | 30 | | | INTERMEDIATE SUBSTANCE | |
| 5 | 20 | 80 | | | INTERMEDIATE SUBSTANCE | NICHROME WIRE |
| 6 | 5 | 95 | | | INTERMEDIATE SUBSTANCE | Ni |
| 7 | | 100 | | | Ni | |
| 8 | | 100 | | | Ni | |
| 9 | | 97 | 3 | | Ni | |
| 10 | | 70 | 20 | 10 | INTERMEDIATE SUBSTANCE | |
| 11 | | 30 | 50 | 20 | INTERMEDIATE SUBSTANCE | |
| 12 | | | 62 | 38 | INTERMEDIATE SUBSTANCE | BRASS |
| 13 | | | 65 | 35 | BRASS | |
| 14 | | | 63 | 37 | BRASS | |
| 15 | | | 65 | 35 | BRASS | |

FIG. 14

| CLASSIFICATION | NAME OF COMPOSITE SUBSTANCE | CONSTITUENT SUBSTANCE 1 | CONSTITUENT SUBSTANCE 2 | CONSTITUENT SUBSTANCE 3 |
|---|---|---|---|---|
| STEEL SHEET | GALVANIZED STEEL SHEET | Zn | IRON AND STEEL | |
| STEEL SHEET | NICKEL PLATED STEEL SHEET | Ni | IRON AND STEEL | |
| BRASS | NICKEL-CHROMIUM PLATED BRASS | Cr | Ni | BRASS |

LASER-INDUCED BREAKDOWN SPECTROSCOPE

CROSS-REFERENCE TO RELATED APPLICATIONS

The present application claims foreign priority based on Japanese Patent Application No. 2021-126162, filed Jul. 30, 2021, the contents of which are incorporated herein by reference.

BACKGROUND OF THE INVENTION

1. Field of the Invention

The technique disclosed herein relates to a laser-induced breakdown spectroscope.

2. Description of Related Art

For example, JP 2020-113569 A discloses an analysis device (spectroscopic device) configured to perform component analysis of a sample. Specifically, the spectroscopic device disclosed in JP 2020-113569 A includes a condenser lens, configured to collect a primary electromagnetic wave (ultraviolet laser light), and a collection head configured to collect a secondary electromagnetic wave (plasma) generated on a sample surface in response to the primary electromagnetic wave in order to perform the component analysis using laser induced breakdown spectroscopy (LIBS). According to JP 2020-113569 A, a peak of a spectrum of the sample is measured from a signal of the secondary electromagnetic wave so that chemical analysis of the sample based on the measured peak can be executed. In a general laser-induced breakdown spectroscope, an analyte is irradiated with laser light, so that plasma light generated in the analyte is detected by a detector, and a spectrum for each wavelength of the plasma light is generated.

Then, elements contained in the analyte and contents thereof are estimated based on the generated spectrum.

Since the spectrum obtained by component analysis of a sample generally has many peaks, it is difficult for a user who is not familiar with analysis to interpret the meaning of the spectrum only with the spectrum. Further, even when the elements contained in the sample and the contents thereof are estimated based on the spectrum, it is difficult to grasp which substance has such a composition. In particular, when the laser-induced breakdown spectroscope is used, the sample can be dug (drilled) in the depth direction. Therefore, a user who performs component analysis sometimes desires to perform not only component analysis on the sample surface but also analysis by drilling the sample in the depth direction to confirm how the substance changes. However, it is difficult for the user who is not familiar with analysis to understand the change in the substance in the depth direction based on the spectrum obtained at each position in the depth direction of the sample or the elements contained in the sample and contents thereof.

A technique disclosed herein has been made in view of the above points, and an object thereof is to easily estimate a change of a substance in a depth direction of a sample and to improve the usability of an analysis device.

SUMMARY OF THE INVENTION

In order to achieve the above object, according to one embodiment of the invention, a laser-induced breakdown spectroscope that performs component analysis of an analyte by using laser induced breakdown spectroscopy can be provided as a premise.

A laser-induced breakdown spectroscope includes: an emitter that emits laser light to an analyte; a collection head that collects plasma light generated in the analyte by irradiating the analyte with the laser light emitted from the emitter; a detector that receives the plasma light generated in the analyte and collected by the collection head, and generates a spectrum which is an intensity distribution of the plasma light for each wavelength; a library holding section that holds a substance library including a constituent element constituting each of substances and a content of the constituent element as information for identifying the substance; a component analysis section that estimates a constituent element constituting the analyte and a content of the constituent element based on the spectrum generated by the detector, and estimates a substance contained in the analyte based on the estimated constituent element and the estimated content of the constituent element and the substance library held in the library holding section; and a display controller that causes a display to display the constituent element and the content of the constituent element, estimated by the component analysis section, and the information for identifying the substance.

Then, the emitter emits the laser light to the analyte a plurality of times to irradiate a plurality of positions having different analysis depths with the laser light. The component analysis section executes estimation of constituent elements constituting the analyte and contents of the constituent elements and estimation of substances contained in the analyte at each of the plurality of positions having the different analysis depths. The display controller causes the display to display a depth analysis window indicating the constituent elements and the contents of the constituent elements at the plurality of positions having the different analysis depths, estimated by the component analysis section, and the information for identifying the substance contained in the analyte, along the analysis depths.

According to this configuration, the component analysis section can estimate the substance based on a type of the constituent element and the content thereof. Here, examples of the substance include stainless steel and SUS-304. Further, the analyte can be dug in a depth direction since the emitter emits the laser light to the analyte the plurality of times. Therefore, the laser light is emitted to different positions in the depth direction, and thus, the component analysis section can calculate the constituent elements constituting the analyte and the contents thereof at the plurality of positions having the different analysis depths, respectively. As a result, not primary information, such as the spectrum, the type of the element, and the content of the element, which need to be interpreted by a user but secondary information obtained by adding interpretation by the component analysis section to the primary information is obtained at the plurality of positions having the different analysis depths. Therefore, even a user who is not familiar with the component analysis can easily understand component analysis results at the respective analysis depths.

Further, the display controller can display a depth display screen (display window) on the display. Since the depth display screen indicates the information for identifying the substance along the depth direction, it is possible to easily grasp how the substance changes in the depth direction of the analyte.

According to another embodiment of the invention, the component analysis section can estimate that a substance at a second analysis depth is an intermediate substance that is changing from a substance at a first analysis depth to a different substance when a content of one constituent element at the first analysis depth is different from a content of the one constituent element at the second analysis depth, deeper than the first analysis depth, by a predetermined threshold or more. Then, the display controller causes the display to display the fact that the substance at the second analysis depth is the intermediate substance when the component analysis section estimates that the substance at the second analysis depth is the intermediate substance.

According to this configuration, it is possible to grasp whether the substance is a so-called pure substance such as a nichrome wire and brass, or is changing from Cr which is a pure substance to a nichrome wire which is a pure substance. Therefore, the user can easily grasp whether the substance contained in the analyte is changing or whether the change has been completed.

According to still another embodiment of the invention, the laser-induced breakdown spectroscope includes an analysis setting section and an emission controller. Then, the component analysis section can estimate that the change from the substance at the first depth to the different substance is completed when the substances estimated at a plurality of analysis depths, deeper than the second analysis depth, are continuously identical. Then, the component analysis section generates a stop signal for causing the emission controller to stop the emission of the laser light when the number of times of emission of the laser light after the start of analysis based on the setting set by the analysis setting section is less than the number of times of emission set by the analysis setting section at a time point when the estimation has been made.

According to this configuration, the component analysis section can detect that the change from one substance to another substance has been completed. In particular, it is estimated that the change to the other substance has been completed when the same substance is continuously estimated a predetermined number of times or more. Thus, even when match with a composition of the third substance occurs by chance during the change from the one substance to the other substance, the third substance is estimated to be the intermediate substance if the third substance is transient. Therefore, the completion of the change to the other substance can be estimated more accurately.

According to still another embodiment of the invention, the library holding section can hold a composite substance library in which a name of a composite substance is associated with configuration information of a plurality of substances constituting the composite substance. Further, the laser-induced breakdown spectroscope further includes a composite substance estimator that estimates a name of a composite substance of the analyte based on the substance estimated at each of the plurality of positions having the different analysis depths and the composite substance library held in the library holding section.

According to this configuration, the composite substance estimator can estimate the name of the composite substance of the analyte based on the substances estimated at the plurality of positions having the different analysis depths by the component analysis section. It is difficult for the user who is not familiar with the analysis to estimate what the analyte itself is only by estimating the substances in an analysis depth order. Since the name of the composite substance of the analyte is also estimated, it is possible to easily identify whether the analyte is a desired composite substance, what kind of impurities have been mixed, and the like.

As described above, it is possible to easily estimate the change in the substance in the depth direction of the sample and to improve the usability of the analysis device.

BRIEF DESCRIPTION OF THE DRAWINGS

FIG. 13 is a view for describing a drilling result;

FIG. 14 is a view for describing a composite substance library;

DETAILED DESCRIPTION OF PREFERRED EMBODIMENTS

Hereinafter, an embodiment of the present disclosure will be described with reference to the drawings. Note that the following description is given as an example.

<Overall Configuration of Analysis and Observation Device A>

Figure 1:
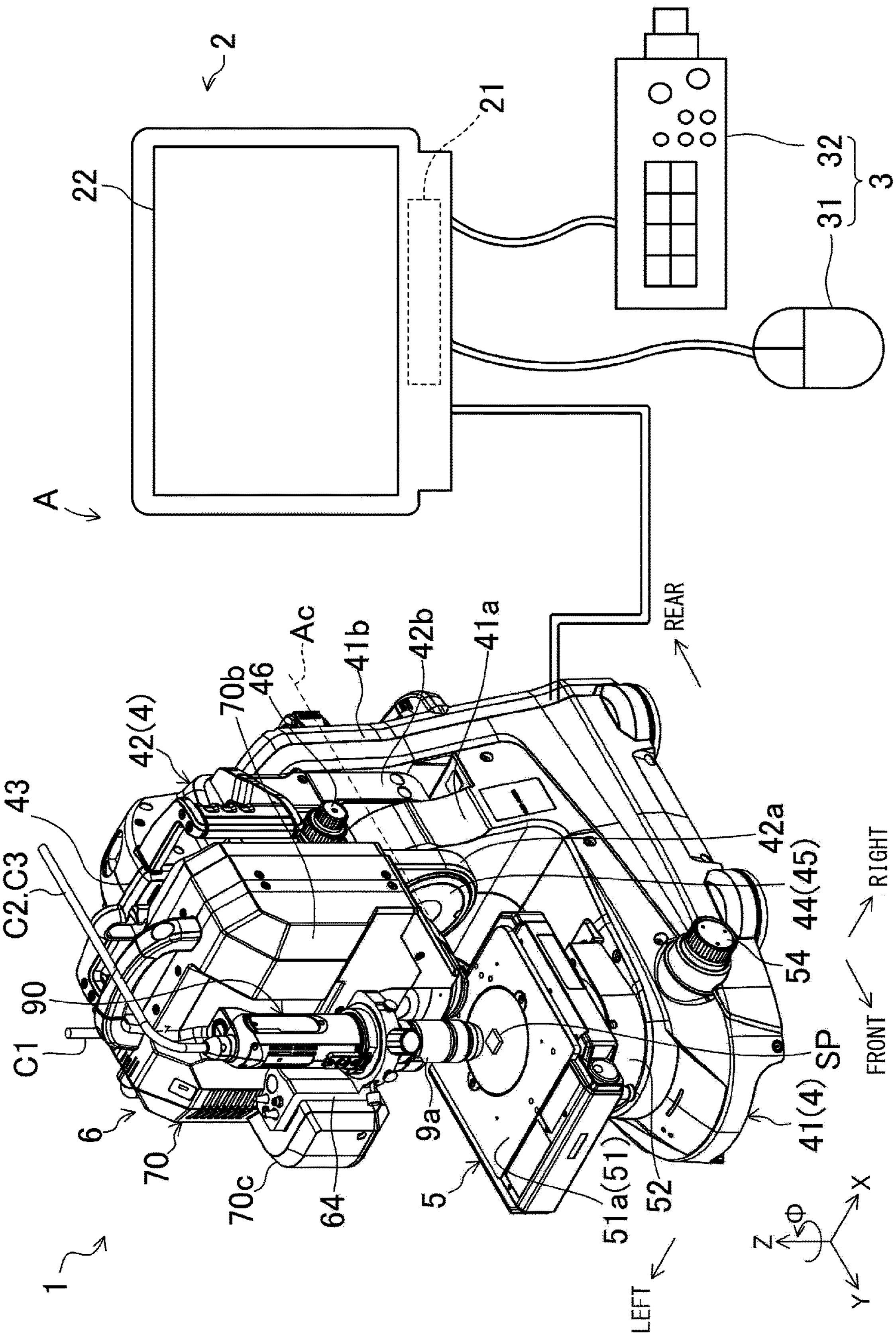
FIG. 1 is a schematic diagram illustrating an overall configuration of an analysis and observation device.

FIG. 1 is a schematic diagram illustrating an overall configuration of an analysis and observation device A as an analysis device according to an embodiment of the present disclosure. The analysis and observation device A illustrated in FIG. 1 can perform magnifying observation of a sample SP, which serves as both of an observation target and an analyte, and can also perform component analysis of the sample SP.

Specifically, for example, the analysis and observation device A according to the present embodiment can search for a site where component analysis is to be performed in the sample SP and perform inspection, measurement, and the like of an appearance of the site by magnifying and capturing an image of the sample SP including a specimen such as a micro object, an electronic component, a workpiece, and the like. When focusing on an observation function, the analysis and observation device A can be referred to as a magnifying observation device, simply as a microscope, or as a digital microscope.

The analysis and observation device A can also perform a method referred to as a laser induced breakdown spectroscopy (LIBS), laser induced plasma spectroscopy (LIPS), or the like in the component analysis of the sample SP. When focusing on an analysis function, the analysis and observation device A can be referred to as a component analysis device, simply as an analysis device, or as a spectroscopic device.

As illustrated in FIG. 1, the analysis and observation device A according to the present embodiment includes an optical system assembly (optical system main body) 1, a controller main body 2, and an operation section 3 as main constituent elements.

Among them, the optical system assembly 1 can perform capturing and analysis of the sample SP and output an electrical signal corresponding to a capturing result and an analysis result to the outside.

The controller main body 2 includes a controller 21 configured to control various components constituting the optical system assembly 1 such as a first camera 81. The controller main body 2 can cause the optical system assembly 1 to observe and analyze the sample SP using the controller 21. The controller main body 2 also includes a display 22 capable of displaying various types of information. The display 22 can display an image captured in the optical system assembly 1, data indicating the analysis result of the sample SP, and the like.

The operation section 3 includes a mouse 31, a console 32, and the like that receive an operation input performed by a user. The console 32 can instruct acquisition of image data, brightness adjustment, and focusing of the first camera 81 or the like to the controller main body 2 by operating a button, an adjustment knob, and the like.

<Details of Optical System Assembly 1>

As illustrated in FIG. 1, the optical system assembly 1 includes: a stage 4 which supports various instruments and on which the sample SP is placed; and a head 6 attached to the stage 4. Here, the head 6 is formed by mounting an observation housing 90 in which an observation optical system 9 is accommodated onto an analysis housing 70 in which an analysis optical system 7 is accommodated. Here, the analysis optical system 7 is an optical system configured to perform the component analysis of the sample SP. The observation optical system 9 is an optical system configured to perform the magnifying observation of the sample SP. The head 6 is configured as a device group having both of an analysis function and a magnifying observation function of the sample SP.

Note that the front-rear direction and the left-right direction of the optical system assembly 1 are defined as illustrated in FIG. 1 in the following description. That is, one side opposing the user is a front side of the optical system assembly 1, and an opposite side thereof is a rear side of the optical system assembly 1. When the user opposes the optical system assembly 1, a right side as viewed from the user is a right side of the optical system assembly 1, and a left side as viewed from the user is a left side of the optical system assembly 1. Note that the definitions of the front-rear direction and the left-right direction are intended to help understanding of the description, and do not limit an actual use state. Any direction may be used as the front.

The head 6 can move along a central axis Ac illustrated in FIG. 1 or swing about the central axis Ac although will be described in detail later. As illustrated in FIG. 1 and the like, the central axis Ac extends along the above-described front-rear direction.

(Stage 4)

The stage 4 includes a base 41 installed on a workbench or the like, a stand 42 connected to the base 41, and a placement stage 5 supported by the base 41 or the stand 42. The stage 4 is a member configured to define a relative positional relation between the placement stage 5 and the head 6, and is configured such that at least the observation optical system 9 and the analysis optical system 7 of the head 6 are attachable thereto.

Figure 2:
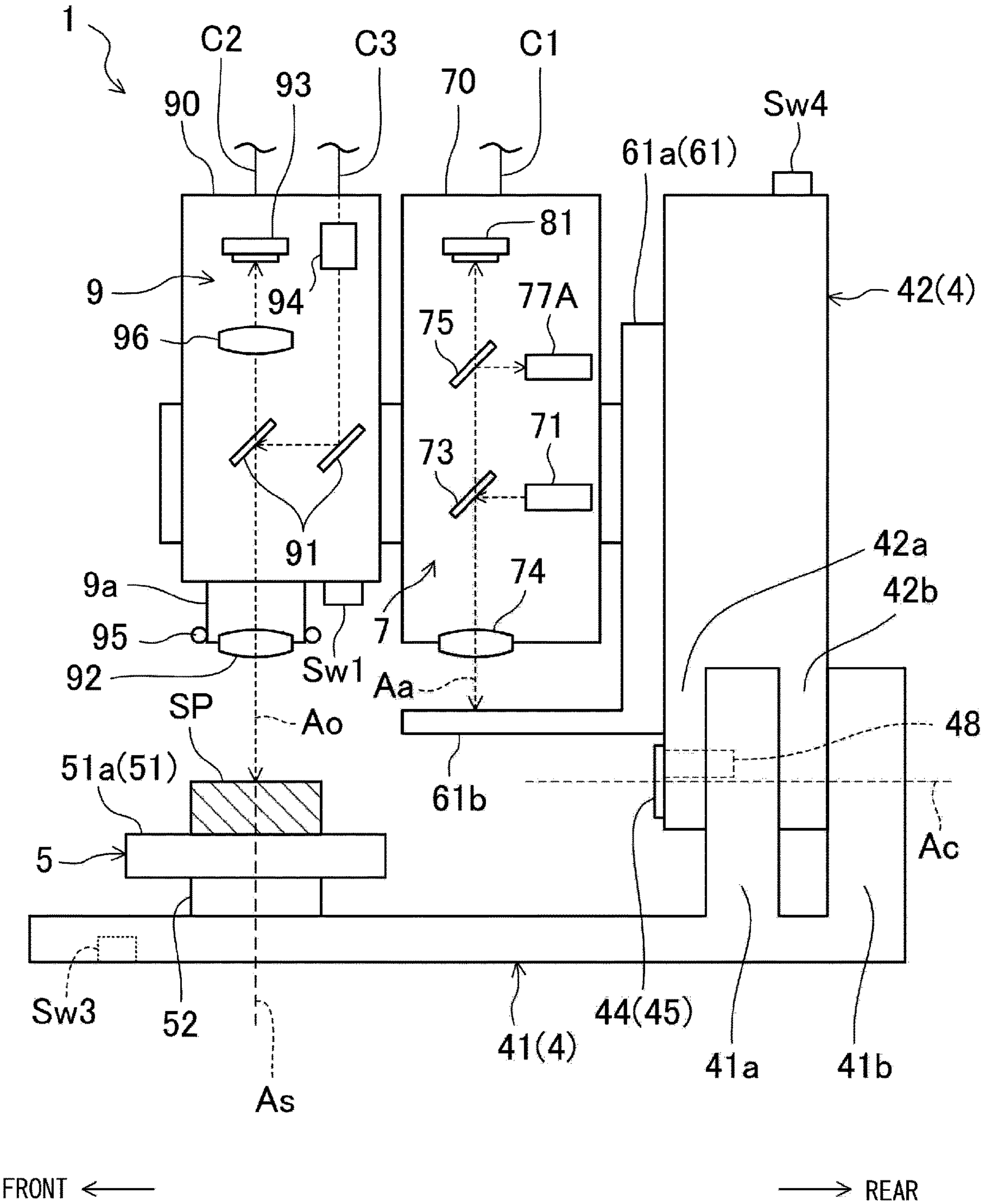
FIG. 2 is a side view schematically illustrating a configuration of the optical system assembly.

As illustrated in FIG. 2, the first supporter 41*a* and the second supporter 41*b* are provided on a rear portion of the base 41 in a state of being arranged side by side in order from the front side. Both the first and second supporters 41*a* and 41*b* are provided so as to protrude upward from the base 41. Circular bearing holes (not illustrated) arranged to be concentric with the central axis Ac are formed in the first and second supporters 41*a* and 41*b*.

Further, a first attachment section 42*a* and a second attachment section 42*b* are provided in a lower portion of the stand 42 in a state of being arranged side by side in order from the front side as illustrated in FIG. 2. The first and second attachment sections 42*a* and 42*b* have configurations corresponding to the first and second supporters 41*a* and 41*b*, respectively. Specifically, the first and second supporters 41*a* and 41*b* and the first and second attachment sections 42*a* and 42*b* are laid out such that the first supporter 41*a* is sandwiched between the first attachment section 42*a* and the second attachment section 42*b* and the second attachment section 42*b* is sandwiched between the first supporter 41*a* and the second supporter 41*b*.

Further, circular bearing holes (not illustrated) concentric with and having the same diameter as the bearing holes formed in the first and second attachment sections 42*a* and 42*b* are formed in the first and second supporters 41*a* and 41*b*. A shaft member 44 is inserted into these bearing holes via a bearing (not illustrated) such as a cross-roller bearing. The shaft member 44 is arranged such that the axis thereof is concentric with the central axis Ac. The base 41 and the stand 42 are coupled so as to be relatively swingable by inserting the shaft member 44. The shaft member 44 forms a tilting mechanism 45 in the present embodiment together with the first and second supporters 41*a* and 41*b* and the first and second attachment sections 42*a* and 42*b*.

Further, the overhead camera 48 is incorporated in the shaft member 44 forming the tilting mechanism 45 as illustrated in FIG. 2. This overhead camera 48 receives visible light reflected by the sample SP through a through-hole 44*a* provided on a front surface of the shaft member 44. The overhead camera 48 captures an image of the sample SP by detecting a light reception amount of the received reflection light.

An imaging visual field of the overhead camera 48 is wider than imaging visual fields of the first camera 81 and a second camera 93 which will be described later. In other words, an enlargement magnification of the overhead camera 48 is smaller than enlargement magnifications of the first camera 81 and the second camera 93. Therefore, the overhead camera 48 can capture the sample SP over a wider range than the first camera 81 and the second camera 93.

Specifically, the overhead camera 48 according to the present embodiment photoelectrically converts light incident through the through-hole 44*a* by a plurality of pixels arranged on a light receiving surface thereof, and converts the light into an electrical signal corresponding to an optical image of a subject (the sample SP).

The overhead camera 48 may have a plurality of light receiving elements arranged along the light receiving surface. In this case, each of the light receiving elements corresponds to a pixel so that an electrical signal based on the light reception amount in each of the light receiving elements can be generated. Specifically, the overhead camera 48 according to the present embodiment is configured using an image sensor including a complementary metal oxide semiconductor (CMOS), but is not limited to this configuration. As the overhead camera 48, for example, an image sensor including a charged-coupled device (CCD) can also be used.

Then, the overhead camera 48 inputs an electrical signal generated by detecting the light reception amount by each light receiving element to the controller 21 of the controller main body 2. The controller 21 generates image data corresponding to the optical image of the subject based on the input electrical signal. The controller 21 can cause the display 22 or the like to display the image data thus generated as the image obtained by capturing the image of the subject.

Note that the above-described configuration of the overhead camera 48 is merely an example. It suffices that the overhead camera 48 has a wider imaging visual field than the first camera 81 and the second camera 93, and the layout of the overhead camera 48, a direction of its imaging optical axis, and the like can be freely changed. For example, the overhead camera 48 may be configured using a USB camera connected to the optical system assembly 1 or the controller main body 2 in a wired or wireless manner.

(Head 6)

The head 6 includes the head attachment member 61, an analysis unit in which the analysis optical system 7 is accommodated in the analysis housing 70, an observation unit in which the observation optical system 9 is accommodated in the observation housing 90, a housing coupler 64, and a slide mechanism (horizontal drive mechanism) 65. The head attachment member 61 is a member configured to connect the analysis housing 70 to the stand 42. The analysis unit is a device configured to perform the component analysis of the sample SP by the analysis optical system 7. The observation unit 63 is a device configured to perform the observation of the sample SP by the observation optical system 9. The housing coupler 64 is a member configured to connect the observation housing 90 to the analysis housing 70. The slide mechanism 65 is a mechanism configured to slide the analysis housing 70 with respect to the stand 42.

Hereinafter, the configurations of the analysis unit, the observation unit, and the slide mechanism 65 will be sequentially described.

—Analysis Unit—

Figure 3:
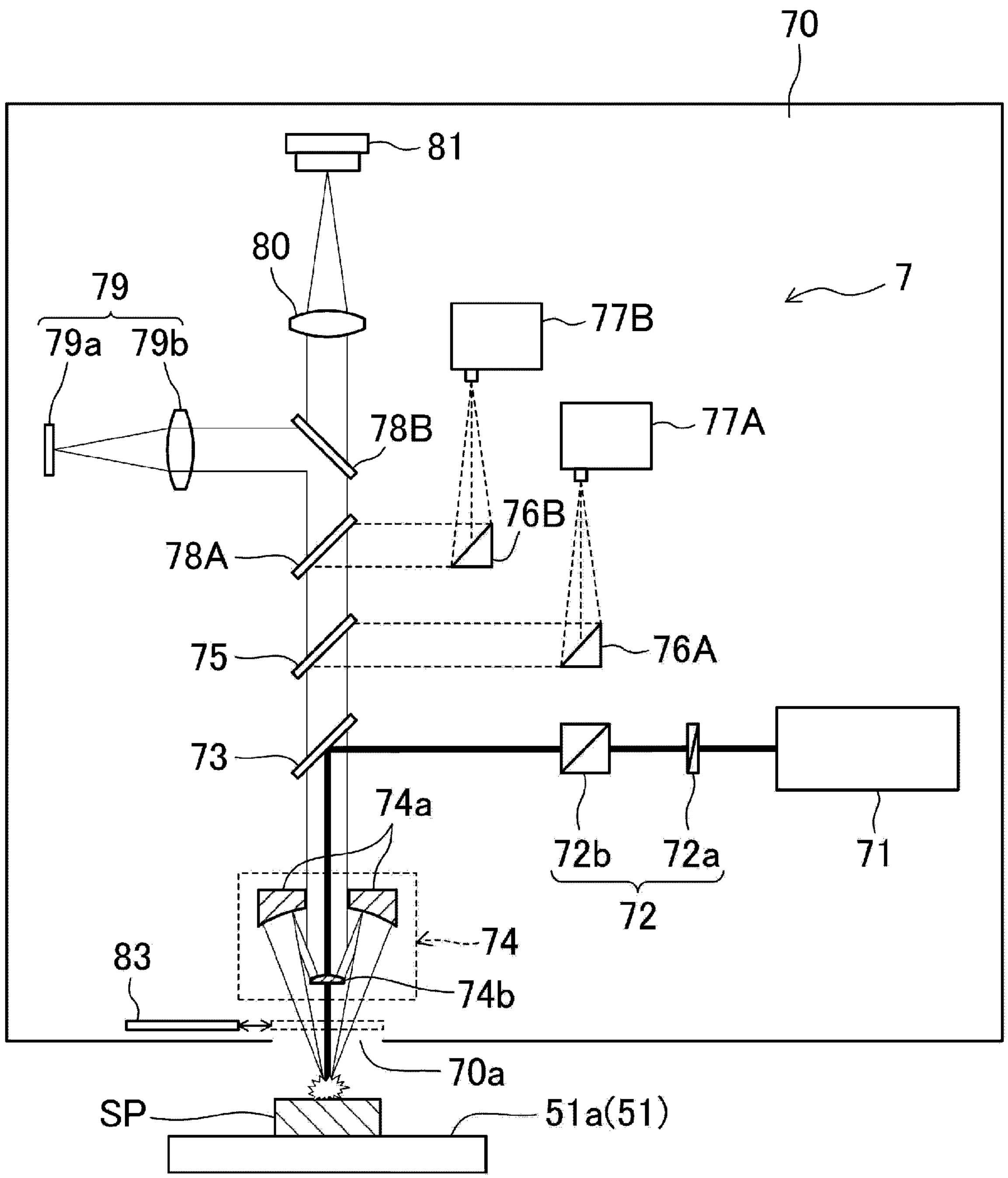
FIG. 3 is a schematic view illustrating a configuration of an analysis optical system.

FIG. 3 is a schematic view illustrating the configuration of the analysis optical system 7.

The analysis unit includes the analysis optical system 7 and the analysis housing 70 in which the analysis optical system 7 is accommodated. The analysis optical system 7 is a set of components configured to analyze the sample SP as an analyte, and the respective components are accommodated in the analysis housing 70. The analysis housing 70 accommodates the first camera 81 as an imaging section and first and second detectors 77A and 77B as detectors. Further, elements configured to analyze the sample SP also include the controller 21 of the controller main body 2.

The analysis optical system 7 can perform analysis using, for example, an LIBS method. A communication cable C1, configured to transmit and receive an electrical signal to and from the controller main body 2, is connected to the analysis optical system 7. The communication cable C1 is not essential, and the analysis optical system 7 and the controller main body 2 may be connected by wireless communication.

Note that the term "optical system" used herein is used in a broad sense. That is, the analysis optical system 7 is defined as a system including a light source, an image capturing element, and the like in addition to an optical element such as a lens. The same applies to the observation optical system 9.

As illustrated in FIG. 3, the analysis optical system 7 according to the present embodiment includes the emitter 71, an output adjuster 72, the deflection element 73, the reflective object lens 74 as the collection head, a dispersing element 75, a first parabolic mirror 76A, the first detector 77A, a first beam splitter 78A, a second parabolic mirror 76B, the second detector 77B, a second beam splitter 78B, a coaxial illuminator 79, an imaging lens 80, a first camera 81, and the side illuminator 84. Some of the constituent elements of the analysis optical system 7 are also illustrated in FIG. 2. Further, the side illuminator 84 is illustrated only in FIG. 5.

The emitter 71 emits a primary electromagnetic wave to the sample SP. In particular, the emitter 71 according to the present embodiment includes a laser light source that emits laser light as the primary electromagnetic wave to the sample SP. Note that the emitter 71 according to the present embodiment can output the laser light formed of ultraviolet rays as the primary electromagnetic wave.

The output adjuster 72 is arranged on an optical path connecting the emitter 71 and the deflection element 73, and can adjust an output of the laser light (primary electromagnetic wave).

The laser light (primary electromagnetic wave) whose output has been adjusted by the output adjuster 72 is reflected by a mirror (not illustrated) and is incident on the deflection element 73.

Specifically, the deflection element 73 is laid out so as to reflect the laser light, which has been output from the emitter 71 and passed through the output adjuster 72, to be guided to the sample SP via the reflective object lens 74, and allow passage of light (which is light emitted due to plasma occurring on the surface of the sample SP, and is hereinafter referred to as "plasma light") generated in the sample SP in response to the laser light and guide the secondary electromagnetic wave to the first detector 77A and the second detector 77B. The deflection element 73 is also laid out to allow passage of visible light collected for capturing and guide most of the visible light to the first camera 81.

Ultraviolet laser light reflected by the deflection element 73 propagates along the analysis optical axis Aa as parallel light and reaches the reflective object lens 74.

The reflective object lens 74 as the collection head is configured to collect the secondary electromagnetic wave generated in the sample SP as the sample SP is irradiated with the primary electromagnetic wave emitted from the emitter 71. In particular, the reflective object lens 74 according to the present embodiment is configured to collect the laser light as the primary electromagnetic wave and irradiate the sample SP with the laser light, and collect the plasma light (secondary electromagnetic wave) generated in the sample SP in response to the laser light (primary electromagnetic wave) applied to the sample SP. In this case, the secondary electromagnetic wave corresponds to the plasma light emitted due to the plasma occurring on the surface of the sample SP.

The reflective object lens 74 has the analysis optical axis Aa extending along the substantially vertical direction. The analysis optical axis Aa is provided to be parallel to the observation optical axis Ao of an objective lens 92 of the observation optical system 9.

Specifically, the reflective object lens 74 according to the present embodiment is a Schwarzschild objective lens including two mirrors. As illustrated in FIG. 3, the reflective object lens 74 includes primary mirror 74*a* having a partial annular shape and a relatively large diameter, and a secondary mirror 74*b* having a disk shape and a relatively small diameter.

The primary mirror 74*a* allows the laser light (primary electromagnetic wave) to pass through an opening provided at the center thereof, and reflects the plasma light (secondary electromagnetic wave) generated in the sample SP by a mirror surface provided in the periphery thereof. The latter plasma light is reflected again by a mirror surface of the secondary mirror 74*b*, and passes through the opening of the primary mirror 74*a* in a state of being coaxial with the laser light.

The secondary mirror 74*b* is configured to transmit the laser light having passed through the opening of the primary mirror 74*a* and collect and reflect the plasma light reflected by the primary mirror 74*a*. The former laser light is applied to the sample SP, but the latter plasma light passes through the opening of the primary mirror 74*a* and reaches the deflection element 73 as described above.

The dispersing element 75 is arranged between the deflection element 73 and the first beam splitter 78A in the optical axis direction (direction along the analysis optical axis Aa) of the reflective object lens 74, and guides a part of the plasma light generated in the sample SP to the first detector 77A and the other part to the second detector 77B or the like. Most of the latter plasma light is guided to the second detector 77B, but the rest reaches the first camera 81.

The first parabolic mirror 76A is a so-called parabolic mirror, and is arranged between the dispersing element 75 and the first detector 77A. The first parabolic mirror 76A collects the secondary electromagnetic wave reflected by the dispersing element 75, and causes the collected secondary electromagnetic wave to be incident on the first detector 77A.

The first detector 77A receives the plasma light (secondary electromagnetic wave) generated in the sample SP and collected by the reflective object lens 74, and generates a spectrum which is an intensity distribution for each wavelength of the plasma light.

In particular, in a case where the emitter 71 is configured using the laser light source and the reflective object lens 74 is configured to collect the plasma light as the secondary electromagnetic wave generated in response to the irradiation of laser light as the primary electromagnetic wave, the first detector 77A reflects light at different angles for each wavelength to separate the light, and causes each beam of the separated light to be incident on an imaging element having a plurality of pixels. As a result, a wavelength of light received by each pixel can be made different, and a light reception intensity can be acquired for each wavelength. In this case, the spectrum corresponds to an intensity distribution for each wavelength of light.

Note that the spectrum may be configured using the light reception intensity acquired for each wave number. Since the wavelength and the wave number uniquely correspond to each other, the spectrum can be regarded as the intensity distribution for each wavelength even when the light reception intensity acquired for each wave number is used. The same applies to the second detector 77B which will be described later.

The first beam splitter 78A reflects a part of light, transmitted through the dispersing element 75 (secondary electromagnetic wave on the infrared side including the visible light band), to be guided to the second detector 77B, and transmits the other part (a part of the visible light band) to be guided to the second beam splitter 78B. A relatively large amount of plasma light is guided to the second detector 77B out of plasma light belonging to the visible light band, and a relatively small amount of plasma light is guided to the first camera 81 via the second beam splitter 78B.

The second parabolic mirror 76B is a so-called parabolic mirror and is arranged between the first beam splitter 78A and the second detector 77B, which is similar to the first parabolic mirror 76A. The second parabolic mirror 76B collects a secondary electromagnetic wave reflected by the first beam splitter 78A, and causes the collected secondary electromagnetic wave to be incident on the second detector 77B.

The second detector 77B receives the secondary electromagnetic wave generated in the sample SP as the sample SP is irradiated with the primary electromagnetic wave emitted from the emitter 71 and generates a spectrum which is an intensity distribution of the secondary electromagnetic wave for each wavelength, which is similar to the first detector 77A.

The ultraviolet spectrum generated by the first detector 77A and the infrared spectrum generated by the second detector 77B are input to the controller 21. The controller 21 performs component analysis of the sample SP using a basic principle, which will be described later, based on these spectra. The controller 21 can perform the component analysis using a wider frequency range by using the ultraviolet spectrum and the infrared intensity in combination.

The second beam splitter 78B reflects illumination light (visible light), which has been emitted from an LED light source 79*a* and passed through the optical element 79*b*, and irradiates the sample SP with the illumination light via the first beam splitter 78A, the dispersing element 75, the deflection element 73, and the reflective object lens 74. Reflection light (visible light) reflected by the sample SP returns to the analysis optical system 7 via the reflective object lens 74.

The coaxial illuminator 79 includes the LED light source 79*a* that emits the illumination light, and the optical element 79*b* through which the illumination light emitted from the LED light source 79*a* passes. The coaxial illuminator 79 functions as a so-called "coaxial epi-illuminator". The illumination light emitted from the LED light source 79*a* propagates coaxially with the laser light (primary electromagnetic wave) output from the emitter 71 and emitted to the sample SP and the light (secondary electromagnetic wave) returning from the sample SP.

Among beams of the reflection light returned to the analysis optical system 7, the second beam splitter 78B further transmits reflection light transmitted through the first beam splitter 78A and plasma light transmitted through the first beam splitter 78A without reaching the first and second detectors 77A and 77B, and causes the reflection light and the plasma light to enter the first camera 81 via the imaging lens 80.

Although the coaxial illuminator 79 is incorporated in the analysis housing 70 in the example illustrated in FIG. 3, the present disclosure is not limited to such a configuration. For example, a light source may be laid out outside the analysis housing 70, and the light source and the analysis optical system 7 may be coupled to the optical system via an optical fiber cable.

The side illuminator 84 is arranged to surround the reflective object lens 74. The side illuminator 84 emits illumination light from the side of the sample SP (in other words, a direction tilted with respect to the analysis optical axis Aa) although not illustrated.

The first camera 81 receives the reflection light reflected by the sample SP via the reflective object lens 74. The first camera 81 captures an image of the sample SP by detecting a light reception amount of the received reflection light. The first camera 81 is an example of the "imaging section" in the present embodiment.

Specifically, the first camera 81 according to the present embodiment photoelectrically converts light incident through the imaging lens 80 by a plurality of pixels arranged on a light receiving surface thereof, and converts the light into an electrical signal corresponding to an optical image of a subject (the sample SP).

The first camera 81 may have a plurality of light receiving elements arranged along the light receiving surface. In this case, each of the light receiving elements corresponds to a pixel so that an electrical signal based on the light reception amount in each of the light receiving elements can be generated. Specifically, the first camera 81 according to the present embodiment is configured using an image sensor including a complementary metal oxide semiconductor (CMOS), but is not limited to this configuration. As the first camera 81, for example, an image sensor including a charged-coupled device (CCD) can also be used.

Then, the first camera 81 inputs an electrical signal generated by detecting the light reception amount by each light receiving element to the controller 21 of the controller main body 2. The controller 21 generates image data corresponding to the optical image of the subject based on the input electrical signal. The controller 21 can cause the display 22 or the like to display the image data thus generated as the image obtained by capturing the image of the subject.

The optical components that have been described so far are accommodated in the analysis housing 70. A through-hole **70*a* is provided in a lower surface of the analysis housing 70. The reflective object lens 74 faces the placement surface 51*a* via the through-hole 70*a***.

—Basic Principle of Analysis by Analysis Optical System 7—

The controller 21 executes component analysis of the sample SP based on the spectra input from the first detector 77A and the second detector 77B as detectors. As a specific analysis method, the LIBS method can be used as described above. The LIBS method is a method for analyzing a component contained in the sample SP at an element level (so-called elemental analysis method).

According to the LIBS method, vacuuming is unnecessary, and component analysis can be performed in the atmospheric open state. Further, although the sample SP is subjected to a destructive test, it is unnecessary to perform a treatment such as dissolving the entire sample SP so that position information of the sample SP remains (the test is only locally destructive).

—Observation Unit—

The observation unit includes the observation optical system 9 and the observation housing 90 in which the observation optical system 9 is accommodated. The observation optical system 9 is a set of components configured to observe the sample SP as the observation target, and the respective components are accommodated in the observation housing 90. The observation housing 90 is configured separately from the analysis housing 70 described above, and accommodates the second camera 93 as a second imaging section. Further, elements configured to observe the sample SP also include the controller 21 of the controller main body 2.

The observation optical system 9 includes a lens unit **9*a* having the objective lens 92. The lens unit 9*a* corresponds to a cylindrical lens barrel arranged on the lower end side of the observation housing 90. The lens unit 9*a* is held by the analysis housing 70**.

A communication cable C2 configured to transmit and receive an electrical signal to and from the controller main body 2 and an optical fiber cable C3 configured to guide illumination light from the outside are connected to the observation housing 90. Note that the communication cable C2 is not essential, and the observation optical system 9 and the controller main body 2 may be connected by wireless communication.

Specifically, the observation optical system 9 includes a mirror group 91, the objective lens 92, the second camera 93 which is the second camera, a second coaxial illuminator 94, a second side illuminator 95, and a magnifying optical system 96 as illustrated in FIG. 2.

The objective lens 92 has the observation optical axis Ao extending along the substantially vertical direction, collects illumination light to be emitted to the sample SP placed on the placement stage main body 51, and collects light (reflection light) from the sample SP. The observation optical axis Ao is provided to be parallel to the analysis optical axis Aa of the reflective object lens 74 of the analysis optical system 7. The reflection light collected by the objective lens 92 is received by the second camera 93.

The mirror group 91 transmits the reflection light collected by the objective lens 92 to be guided to the second camera 93. The mirror group 91 according to the present embodiment can be configured using a total reflection mirror, a beam splitter, and the like as illustrated in FIG. 2. The mirror group 91 also reflects the illumination light emitted from the second coaxial illuminator 94 to be guided to the objective lens 92.

The second camera 93 receives the reflection light reflected by the sample SP via the objective lens 92. The second camera 93 captures an image of the sample SP by detecting a light reception amount of the received reflection light. The second camera 93 is an example of the "second imaging section" in the present embodiment.

On the other hand, the first camera 81 is an example of the "imaging section" in the present embodiment as described above. Although a configuration in which the second camera 93 is regarded as the second imaging section and the first camera 81 is regarded as the imaging section will be mainly described in the present specification, the first camera 81 may be regarded as the second imaging section and the second camera 93 may be regarded as the imaging section as will be described later.

The second camera 93 according to the present embodiment includes an image sensor including a CMOS similarly to the first camera 81, but an image sensor including a CCD can also be used.

Then, the second camera 93 inputs an electrical signal generated by detecting the light reception amount by each light receiving element to the controller 21 of the controller main body 2. The controller 21 generates image data corresponding to the optical image of the subject based on the input electrical signal. The controller 21 can cause the display 22 or the like to display the image data thus generated as the image obtained by capturing the image of the subject.

The second coaxial illuminator 94 emits the illumination light guided from the optical fiber cable C3. The second coaxial illuminator 94 emits the illumination light through an optical path common to the reflection light collected through the objective lens 92. That is, the second coaxial illuminator 94 functions as a "coaxial epi-illuminator" coaxial with the observation optical axis Ao of the objective lens 92. Note that a light source may be incorporated in the lens unit 9*a*, instead of guiding the illumination light from the outside through the optical fiber cable C3. In that case, the optical fiber cable C3 is unnecessary.

As schematically illustrated in FIG. 2, the second side illuminator 95 is configured by a ring illuminator arranged so as to surround the objective lens 92. The second side illuminator 95 emits illumination light from obliquely above the sample SP similarly to the side illuminator 84 in the analysis optical system 7.

The magnifying optical system 96 is arranged between the mirror group 91 and the second camera 93, and is configured to be capable of changing an enlargement magnification of the sample SP by the second camera 93. The magnifying optical system 96 according to the present embodiment includes a variable magnification lens and an actuator configured to move the variable magnification lens along an optical axis of the second camera 93. The actuator can change the enlargement magnification of the sample SP by moving the variable magnification lens based on a control signal input from the controller 21.

—Slide Mechanism 65—

Figure 4:
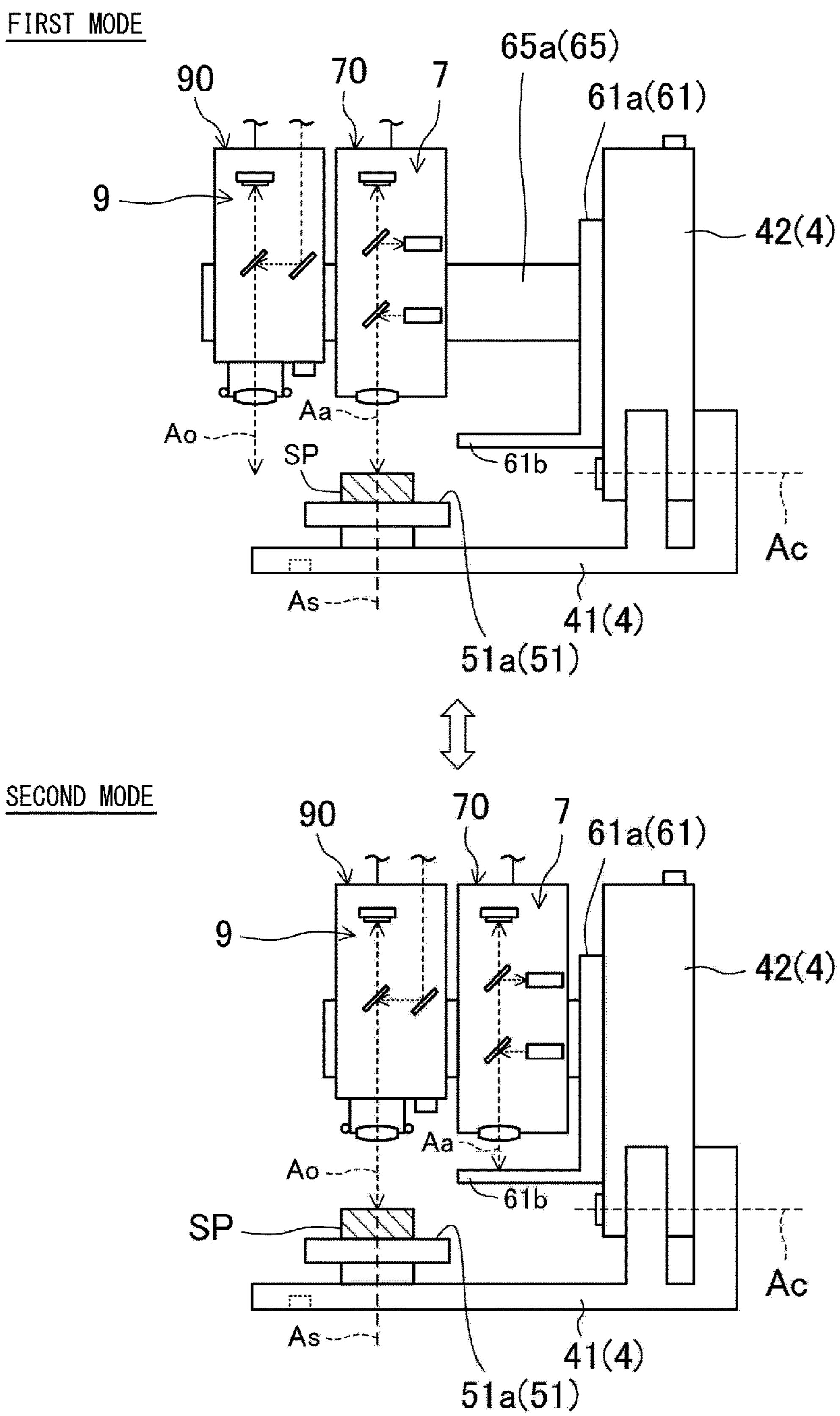
FIG. 4 is a view for describing the horizontal movement of the head.

FIG. 4 is a view for describing the horizontal movement of the head 6 by the slide mechanism 65.

The slide mechanism 65 is configured to move the relative positions of the observation optical system 9 and the analysis optical system 7 with respect to the placement stage main body 51 along the horizontal direction such that the capturing of the sample SP by the observation optical system 9 and the irradiation of the electromagnetic wave (laser light) (in other words, the irradiation of the electromagnetic wave by the emitter 71 of the analysis optical system 7) in the case of generating the spectrum by the analysis optical system 7 can be performed on the identical point in the sample SP as the observation target.

The moving direction of the relative position by the slide mechanism 65 can be a direction in which the observation optical axis Ao and the analysis optical axis Aa are arranged. As illustrated in FIG. 4, the slide mechanism 65 according to the present embodiment moves the relative positions of the observation optical system 9 and the analysis optical system 7 with respect to the placement stage main body 51 along the front-rear direction.

The slide mechanism 65 according to the present embodiment relatively displaces the analysis housing 70 with respect to the stand 42 and the head attachment member 61. Since the analysis housing 70 and the lens unit 9*a* are coupled by the housing coupler 64, the lens unit 9*a* is also integrally displaced by displacing the analysis housing 70.

Specifically, the slide mechanism 65 according to the present embodiment includes the guide rail 65*a* and an actuator 65*b*, and the guide rail 65*a* is formed to protrude forward from a front surface of the head attachment member 61.

When the slide mechanism 65 is operated, the head 6 slides along the horizontal direction, and the relative positions of the observation optical system 9 and the analysis optical system 7 with respect to the placement stage 5 move (horizontally move) as illustrated in FIG. 4. This horizontal movement causes the head 6 to switch between a first mode in which the reflective object lens 74 faces the sample SP and a second mode in which the objective lens 92 faces the sample SP. The slide mechanism 65 can slide the analysis housing 70 and the observation housing 90 between the first mode and the second mode.

With the above configuration, the generation of the image of the sample SP by the observation optical system 9 and the generation of the spectrum by the analysis optical system 7 (specifically, the irradiation of the primary electromagnetic wave by the analysis optical system 7 when the spectrum is generated by the analysis optical system 7) can be executed on the identical point in the sample SP from the same direction at timings before and after performing the switching between the first mode and the second mode.

<Details of Controller Main Body>

Figure 5:
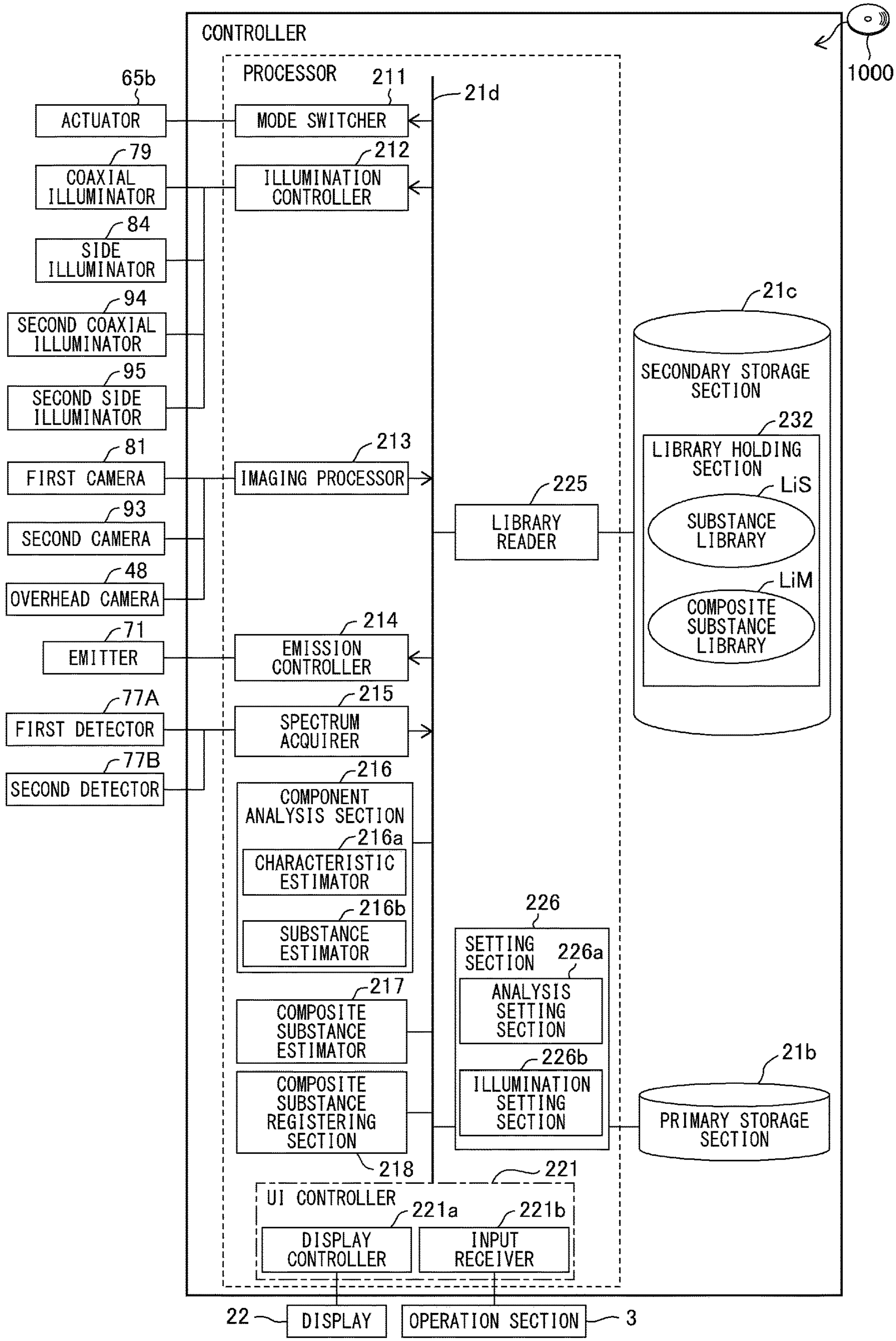
FIG. 5 is a block diagram illustrating a configuration of a controller.

FIG. 5 is a block diagram illustrating the configuration of the controller 21 of the controller main body 2. Note that the controller main body 2 and the optical system assembly 1 are configured separately in the present embodiment, but the present disclosure is not limited to such a configuration. At least a part of the controller main body 2 may be provided in the optical system assembly 1. For example, at least a part of the processor 21*a* constituting the controller 21 can be incorporated in the optical system assembly 1.

As described above, the controller main body 2 according to the present embodiment includes the controller 21 that performs various processes and the display 22 that displays information related to the processes performed by the controller 21.

The controller 21 electrically controls the actuator 65*b*, the coaxial illuminator 79, the side illuminator 84, the second coaxial illuminator 94, the second side illuminator 95, the first camera 81, the second camera 93, the overhead camera 48, the emitter 71, the first detector 77A, and the second detector 77B.

Further, output signals of the first camera 81, the second camera 93, the overhead camera 48, the first detector 77A, and the second detector 77B are input to the controller 21. The controller 21 executes calculation or the like based on the input output signal, and executes processing based on a result of the calculation. As hardware for performing such processing, the controller 21 according to the present embodiment includes the processor 21*a* that executes various types of processing, a primary storage section 21*b* and the secondary storage section 21*c* that store data related to the processing performed by the processor 21*a*, and an input/output bus 21*d*.

The processor 21*a* includes a CPU, a system LSI, a DSP, and the like. The processor 21*a* executes various programs to analyze the sample SP and control the respective sections of the analysis and observation device A such as the display 22. In particular, the processor 21*a* according to the present embodiment can control a display screen (display window) on the display 22 based on information indicating the analysis result of the sample SP and pieces of the image data input from the first camera 81, the second camera 93, and the overhead camera 48.

Note that the display as a control target of the processor 21*a* is not limited to the display 22 provided in the controller main body 2. The "display" according to the present disclosure also includes a display that is not provided in the analysis and observation device A. For example, a display of a computer, a tablet terminal, or the like connected to the analysis and observation device Ain a wired or wireless manner may be regarded as a display, and the information indicating the analysis result of the sample SP and various types of image data may be displayed on the display. In this manner, the present disclosure can also be applied to an analysis system including an analysis and observation device A and a display connected to the analysis and observation device Ain a wired or wireless manner.

As illustrated in FIG. 5, the processor 21*a* according to the present embodiment includes, functional elements, a mode switcher 211, an illumination controller 212, an imaging processor 213, an emission controller 214, a spectrum acquirer 215, a component analysis section 216, a composite substance estimator 217, a composite substance registering section 218, a user interface controller (hereinafter simply referred to as "UI controller") 221, a library reader 225, and a setting section 226. These elements may be implemented by a logic circuit or may be implemented by executing software. Further, at least some of these elements, such as the head 6, can also be provided in the optical system assembly 1.

Note that the classification of the spectrum acquirer 215, the component analysis section 216, and the like is merely for convenience and can be freely changed. For example, the component analysis section 216 may also serve as the spectrum acquirer 215, or the spectrum acquirer 215 may also serve as the component analysis section 216.

The UI controller 221 includes a display controller 221*a* and an input receiver 221*b*. The display controller 221*a* causes the display 22 to display a component analysis result obtained by the component analysis section 216 and an image generated by the imaging processor 213 on the display 22. The input receiver 221*b* receives an operation input by the user through the operation section 3.

The library reader 225 reads a substance library LiS held in a library holding section 232 in order to estimate a substance by a substance estimator 216*b*. Further, the library reader 225 reads a composite substance library LiM held in the library holding section 232 in order to estimate a composite substance by the composite substance estimator 217.

The primary storage section 21*b* is configured using a volatile memory or a non-volatile memory. The primary storage section 21*b* according to the present embodiment can store various settings set by the setting section 226. Further, the primary storage section 21*b* can also hold an analysis program for causing the analysis and observation device A to execute each of steps constituting an analysis method according to the present embodiment.

The secondary storage section 21*c* is configured using a non-volatile memory such as a hard disk drive and a solid state drive. The secondary storage section 21*c* includes the library holding section 232 that holds the substance library LiS and the composite substance library LiM. Note that a data holding section that stores various types of data may be further included. The secondary storage section 21*c* can continuously store the substance library LiS and the composite substance library LiM. Note that the substance library LiS and the composite substance library LiM may be stored in a storage medium such as an optical disk instead of being stored in the secondary storage section 21*c*. Alternatively, various types of data may be stored in a computer, a tablet terminal, or the like connected to the analysis and observation device Ain a wired or wireless manner.

1. Component Analysis of Sample SP

—Spectrum Acquirer 215—

The spectrum acquirer 215 illustrated in FIG. 5 acquires the spectra generated by the first and second detectors 77A and 77B as the detectors. Here, the spectra acquired by the spectrum acquirer 215 is an example of "analysis data".

Specifically, in the first mode, a secondary electromagnetic wave (for example, plasma light) is generated by emitting a primary electromagnetic wave (for example, laser light) from the emitter 71. This secondary electromagnetic wave reaches the first detector 77A and the second detector 77B.

The first and second detectors 77A and 77B as the detectors generate the spectra based on the secondary electromagnetic waves arriving at each of them. The spectra thus generated are acquired by the spectrum acquirer 215. The spectra acquired by the spectrum acquirer 215 represent a relationship between a wavelength and an intensity, and there are a plurality of peaks corresponding to characteristics contained in the sample SP. The spectrum acquired by the spectrum acquirer 215 is output to the component analysis section 216 in order to perform the component analysis of the sample SP.

—Component Analysis Section 216—

The component analysis section 216 illustrated in FIG. 5 identifies a peak position of a spectrum for executing the component analysis of the sample SP based on the spectrum acquired by the spectrum acquirer 215. Thus, it is possible to determine that an element corresponding to the peak position is a component contained in the sample SP, and it is also possible to determine component ratios of the respective elements and estimate the composition of the sample SP based on the determined component ratios by comparing magnitudes of peaks (heights of peaks).

The component analysis section 216 includes a characteristic estimator 216*a* and the substance estimator 216*b*. The characteristic estimator 216*a* estimates a characteristic Ch of a substance contained in the sample SP based on the spectrum acquired by the spectrum acquirer 215. For example, in a case where the LIBS method is used as the analysis method, the characteristic estimator 216*a* extracts a position of a peak in the acquired spectrum and a height of the peak. Then, the characteristic estimator 216*a* estimates a constituent element of the sample SP and a content of the constituent element as the characteristic Ch of the substance based on the peak position and the peak height thus extracted.

The substance estimator 216*b* illustrated in FIG. 5 estimates the substance based on the characteristic Ch of the substance estimated by the characteristic estimator 216*a* and the substance library LiS held in the secondary storage section 21*c*. Here, the characteristic Ch of the substance estimated by the characteristic estimator 216*a* and the substance estimated by the substance estimator 216*b* are examples of "analysis data".

Here, the substance library LiS will be described with reference to FIG. 6. The substance library LiS includes pieces of hierarchical information of a superclass C1 representing a general term of substances considered to be contained in the sample SP and subclasses C3 representing the substances belonging to the superclass C1. The superclass C1 may include at least one or more of the subclasses C3 belonging thereto. Here, the superclass C1 is an example of information for identifying a substance.

For example, when the sample SP is a steel material, the superclass C1, which is the information for identifying a substance, may be a class such as alloy steel, carbon steel, and cast iron or may be a class, such as stainless steel, cemented carbide, and high-tensile steel, obtained by subdividing these classes.

Further, when the sample SP is the steel material, the subclass C3 may be a class such as austenitic stainless steel, precipitation hardening stainless steel, and ferritic stainless steel, or may be a class, such as SUS301 and SUS302, obtained by subdividing these classes based on, for example, Japanese Industrial Standards (JIS). The subclass C3 may be at least a class obtained by subdividing the superclass C1. In other words, the superclass C1 may be a class to which at least some of the subclasses C3 belong.

Further, one or more intermediate classes C2 may be provided between the superclass C1 and the subclass C3. In this case, the substance library LiS is configured by storing the hierarchical information of the intermediate class C2 together with pieces of the hierarchical information of the superclass C1 and the subclass C3. This intermediate classes C2 represent a plurality of strains belonging to the superclass C1. Here, the intermediate class C2 is an example of the information for identifying a substance.

For example, in a case where the sample SP is a steel material, classes such as stainless steel, cemented carbide, and high-tensile steel are used as the superclasses C1, which are the information for identifying a substance, and classes such as SUS301, SUS302, and A2017 are used as the subclasses C3, the intermediate class C2, which is the information for identifying a substance, may be a class such as austenitic and precipitation hardening, or may be a class collectively referring to some of the subclasses C3 such as "SUS300 series".

Further, the subclass C3 constituting the substance library LiS is configured to be associated with the characteristic Ch of the substance considered to be contained in the sample SP. For example, in the case of using the LIBS method as the analysis method, the characteristic Ch of the substance contains information that summarizes a constituent element of the sample SP and a content (or content rate) of the constituent element in one set.

In this case, for each of substances constituting the subclass C3, a combination of constituent elements and an upper limit value and a lower limit value of a content (or a content rate) of each of the constituent elements are incorporated into the substance library Li, so that the subclass C3 can be estimated from the characteristic Ch of the substance as will be described later.

The secondary storage section 21*c* illustrated in FIG. 5 is configured using a non-volatile memory such as a hard disk drive and a solid state drive. The secondary storage section 21*c* can continuously store the substance libraries LiS. Note that the substance library LiS may be read from the outside, such as a storage medium 1000, instead of storing the substance library LiS in the secondary storage section 21*c*.

Further, the controller main body 2 can read the storage medium 1000 storing a program (see FIG. 5). In particular, the storage medium 1000 according to the present embodiment stores the analysis program for causing the analysis and observation device A to execute the respective steps constituting the analysis method according to the present embodiment. This analysis program is read and executed by the controller main body 2 which is a computer. As the controller main body 2 executes the analysis program, the analysis and observation device A functions as the analysis device that executes the respective steps constituting the analysis method according to the present embodiment.

As described above, the subclass C3 constituting the substance library LiS is configured to be associated with the characteristic Ch of the substance considered to be contained in the sample SP. Therefore, the substance estimator 216*b* collates the characteristic Ch of the substance estimated by the characteristic estimator 216*a* with the substance library LiS held in the secondary storage section 21*c*, thereby estimating, from subclass C3, the substance for which the characteristic Ch has been estimated. The collation here refers to not only calculating a similarity degree with representative data registered in the substance library LiS but also the general act of acquiring an index indicating the accuracy of a substance using the parameter group registered in the substance library Li.

Figure 6:
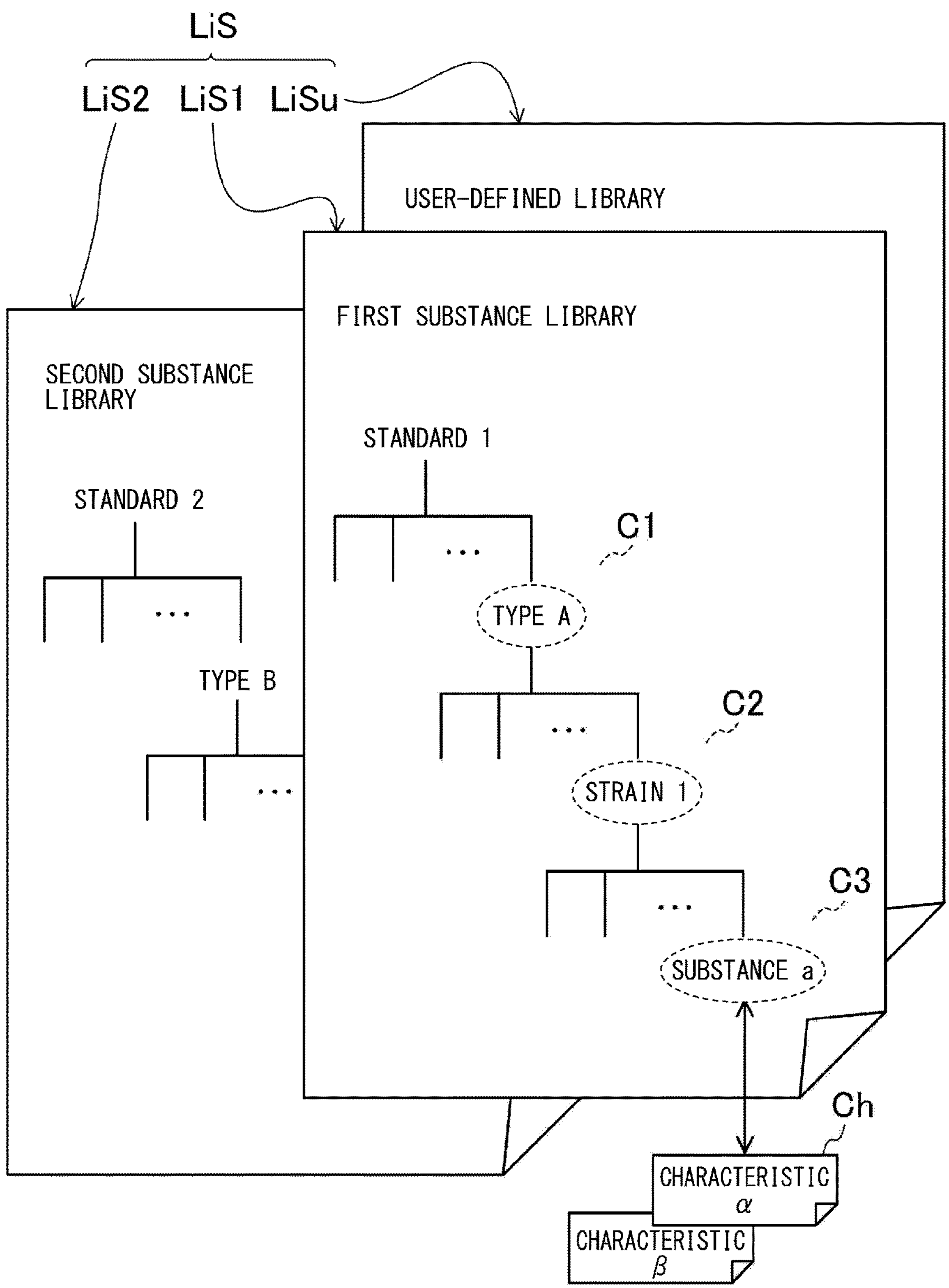
FIG. 6 is a view for describing a concept of a substance library.

Here, not only a case where the subclass C3 and the characteristic Ch are uniquely linked like a "substance a" and a "characteristic a" illustrated in FIG. 6, but also a case where there are a plurality of candidates of the subclasses C3 corresponding to the "characteristic a" is conceivable. In that case, the characteristic estimator 216*a* estimates a plurality of substances each having a relatively high accuracy among substances that are likely to be contained in the sample SP from among the subclasses C3, and outputs the estimated subclasses C3 in descending order of the accuracy. Here, as the accuracy, an index based on a parameter obtained at the time of analyzing the spectrum can be used.

Further, the substance estimator 216*b* collates the estimated subclass C3 with the substance library LiS to estimate the intermediate class C2 and the superclass C1 to which the subclass C3 belongs.

The characteristic Ch of the substance estimated by the characteristic estimator 216*a* and a characteristic estimated by the substance estimator 216*b* are output to the analysis history holding section 231 as one data constituting the analysis record AR. Further, the characteristic Ch of the substance and the characteristic are output to the UI controller 221 and displayed on the display 22.

—Analysis Setting Section 226*a*—

An analysis setting section 226*a* illustrated in FIG. 5 receives various settings related to the analysis of the sample SP. In particular, it is possible to receive a weighting setting for a specific element in order to estimate a characteristic of the sample SP here.

When receiving an analysis setting request by the input receiver 221*b*, the analysis setting section 226*a* generates an analysis setting screen. The analysis setting screen generated by the analysis setting section 226*a* is output to the display controller 221*a*. Then, the display controller 221*a* displays the analysis setting screen on the display 22. An example of the analysis setting screen displayed on the display 22 is illustrated on the left side of FIG. 7. As in the example of FIG. 7, a periodic table (only a part of the periodic table is illustrated in the example illustrated in the drawing), a first icon Ic1 with a note "selection from list", and a second icon Ic2 with a note "recalculation" can be displayed in the analysis setting screen.

Figure 7:
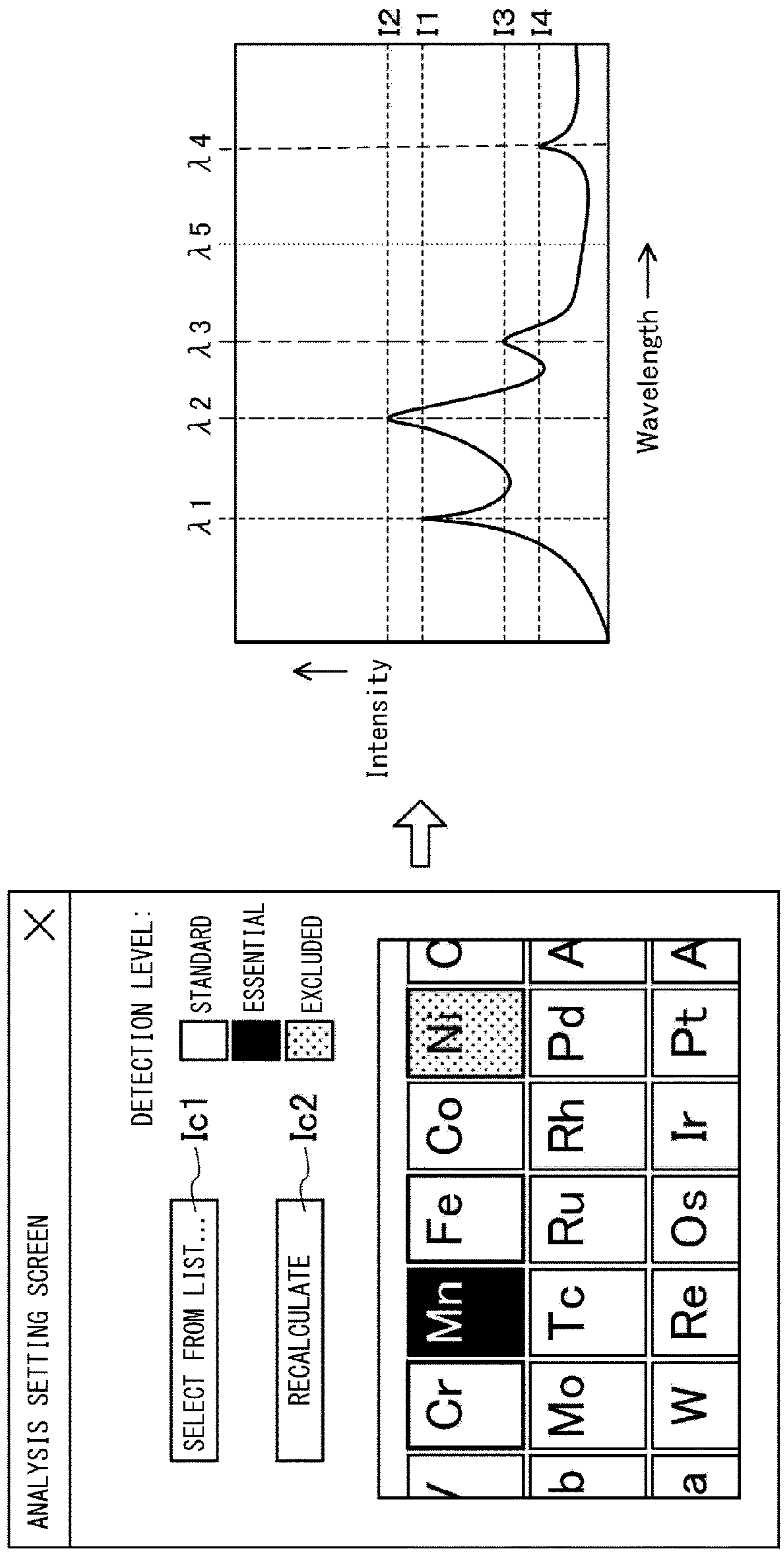
FIG. 7 is a view for describing an analysis setting.

Here, the input receiver 221*b* is configured to receive an operation input for each element in the periodic table displayed on the display. As illustrated in FIG. 7, each of the elements can be classified based on the operation input made for each of the elements into three types of detection levels including a standard item displaying an element name in black, an essential item displaying an element name in white, and an excluded item displaying an element name overlapping with a polka-dot pattern. When an operation input is performed on the second icon Ic2 in a state where the detection levels are set for the respective elements, the input receiver 221*b* having received the operation input instructs the component analysis section 216 to preform reanalysis. The component analysis section 216, which has been instructed to perform reanalysis, re-extracts a peak position and a peak height from the spectrum, and re-estimates a characteristic Ch and a substance. Note that the display controller 221_a_ may cause the display 22 to display the updated peak position superimposed and displayed on the spectrum in response to the re-extraction of the peak position and the peak height by the component analysis section 216.

The detection level, which is a class of an element, will be described. An element classified as the standard item is detected as a detection element when its peak has been found in the spectrum. A position of the peak of the element detected as the detection element may be displayed to be distinguishable on the spectrum displayed on the display 22 by the display controller 221_a_.

Further, an element classified as the essential item is detected as a detection element constituting the characteristic Ch regardless of whether or not its peak is present in the spectrum. In the example illustrated in FIG. 7, manganese is classified as the essential item. In this case, the characteristic estimator 216_a_ estimates a characteristic on the assumption that a peak is present at a position of a wavelength λ5 corresponding to manganese. Furthermore, the display controller 221_a_ can superimpose and display the position of the wavelength λ5 corresponding to manganese on the spectrum. For example, when the sample SP does not contain manganese, a chain line indicating the wavelength λ5 is superimposed and displayed at a position where the peak does not appear in the spectrum as illustrated in FIG. 7.

Further, an element classified as the excluded item is excluded from detection elements constituting the characteristic Ch regardless of whether or not its peak is present in the spectrum. In the example illustrated in FIG. 7, nickel is classified as the excluded item. In this case, the characteristic estimator 216_a_ estimates characteristics from the detection elements other than the excluded item on the assumption that the element classified as the excluded item is not included. Furthermore, a chain line indicating a wavelength corresponding to nickel is not displayed at a position of the peak corresponding to nickel regardless of the magnitude of a height of the peak, which is different from the spectrum exemplified in FIG. 7.

That is, when there is an element classified as the essential item, the characteristic estimator 216_a_ re-estimates the characteristic Ch such that the element classified as the essential item is to be detected as a detection element constituting the characteristic regardless of whether or not a peak corresponding to the essential item is present in the spectrum. Further, when there is an element classified as the excluded item, the characteristic Ch is re-estimated such that the element classified as the excluded item is not to be detected as a detection element constituting the characteristic Ch regardless of whether or not a peak corresponding to the excluded item is present in the spectrum.

Further, when receiving an operation input for the first icon Ic1 illustrated in FIG. 7, the display controller 221_a_ displays a list of the respective elements in a bulleted list on the display 22 (not illustrated). Then, the input receiver 221_b_ can individually receive a class, such as the above-described standard item, essential item, and excluded item for each of the elements in the list.

The analysis setting set on the analysis setting screen is output to the primary storage section 21_b_. Further, the component analysis section 216 acquires the analysis setting stored in the primary storage section 21_b_, and estimates the characteristic Ch based on the analysis setting and the spectrum. In this manner, the analysis setting section 226_a_ can perform the setting so as to extract the essential item which is a characteristic that is recognized by the user as being included in an analyte in advance. A plurality of peaks are displayed on a spectrum. Therefore, it is sometimes difficult to accurately extract the essential item from the spectrum in a case where when a peak is present at a position slightly deviated from a peak corresponding to the essential item. Even in such a case, when the essential item is set in advance, it is possible to extract the characteristic that is recognized by the user as being included in the analyte in advance and to obtain a component analysis result that is closer to the user's expectations.

Further, the analysis setting section 226_a_ can perform the setting such that the excluded item, which is a characteristic that is recognized by the user as not included in the analyte, is not to be extracted. A plurality of peaks are displayed on a spectrum. Therefore, in a case where a peak position deviates even slightly from an ideal position, there is a possibility that a different characteristic may be extracted instead of a characteristic that is to be originally extracted. When a characteristic that is recognized by the user as not included in the analyte in advance is set as the excluded item is set in advance, the excluded item can be excluded from extraction targets of the component analysis section. As a result, a characteristic can be extracted from characteristics other than the characteristic that is recognized by the user as not included in the analyte, and the component analysis result closer to the user's expectations can be obtained.

The analysis setting section 226_a_ can also set a condition for component analysis by the component analysis section 216. For example, an intensity of an electromagnetic wave or a primary ray to be emitted from the emitter 71 and an integration time when a spectrum is acquired by the spectrum acquirer 215 can be received as the analysis setting.

<Component Analysis Flow>

Figure 8:
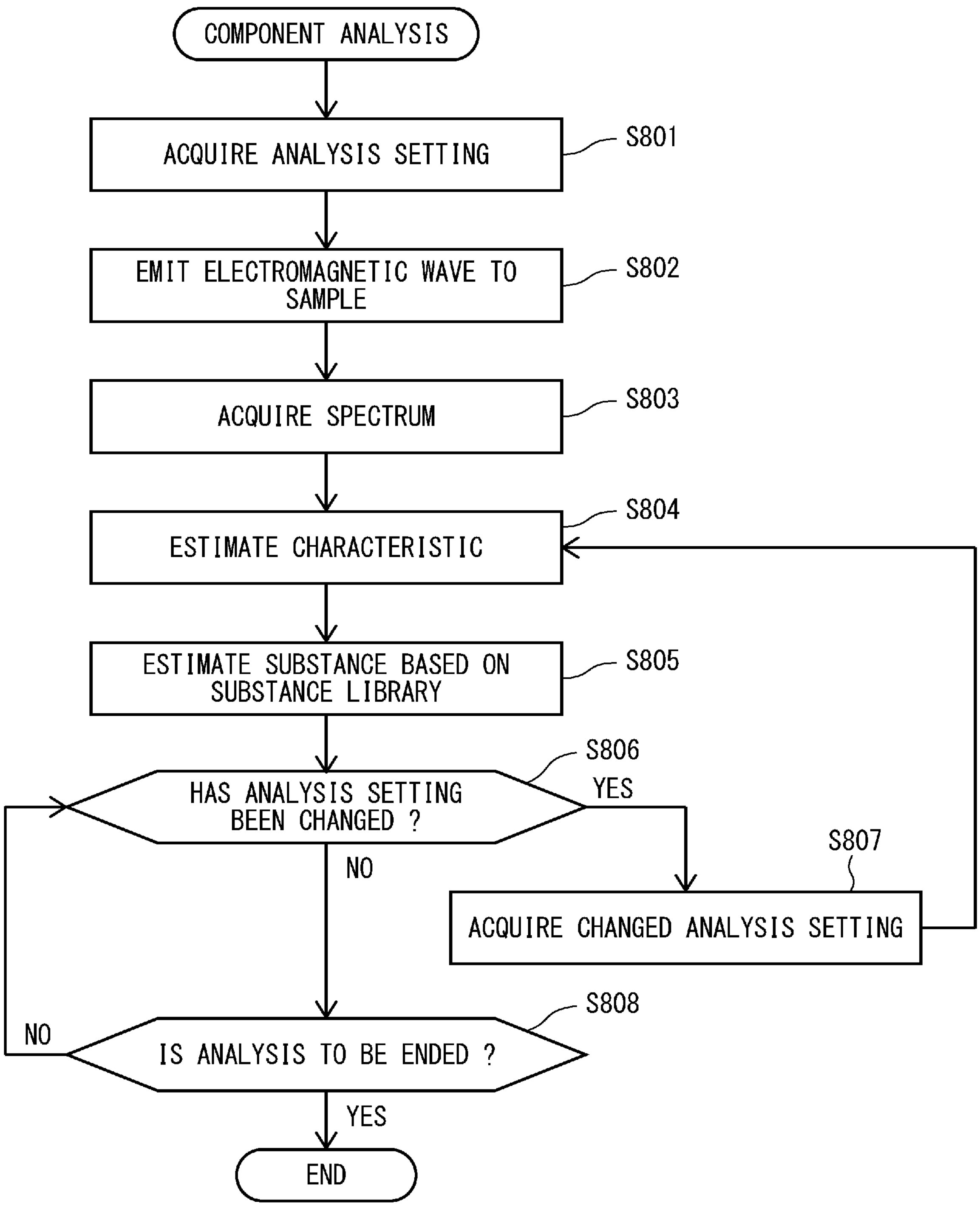
FIG. 8 is a flowchart illustrating a sample analysis procedure by the controller.

FIG. 8 is a flowchart illustrating an analysis procedure of the sample SP performed by the processor 21_a_.

First, in step S801, the component analysis section 216 acquires an analysis setting stored in the primary storage section. Note that this step can be skipped if the analysis setting has not been set in advance.

Next, in step S802, the emission controller 214 controls the emitter 71 based on the analysis setting set by the analysis setting section 226_a_, whereby laser light is emitted to the sample SP as an electromagnetic wave.

Next, in step S803, the spectrum acquirer 215 acquires a spectrum generated by the first and second detectors 77A and 77B. That is, plasma light caused by the electromagnetic wave emitted from the emitter 71 is received by the first and second detectors 77A and 77B. The first and second detectors 77A and 77B generate the spectrum which is an intensity distribution for each wavelength of the plasma light based on the analysis setting set by the analysis setting section 226_a_. The spectrum acquirer 215 acquires the spectrum, which is the analysis data, generated by the first and second detectors 77A and 77B.

In the subsequent step S804, the characteristic estimator 216_a_ estimates the characteristic Ch of a substance contained in the sample SP based on the analysis setting and the spectrum acquired by the spectrum acquirer 215. In this example, the characteristic estimator 216_a_ estimates a constituent element of the sample SP and a content of the constituent element as the characteristic Ch of the substance which is the analysis data. This estimation may be performed based on various physical models, may be performed through a calibration curve graph, or may be performed using a statistical method such as multiple regression analysis.

In the subsequent step S805, the substance estimator 216*b* estimates the substance contained in the sample SP (particularly the substance at a position irradiated with laser light) as the analysis data based on the characteristic Ch of the substance estimated by the characteristic estimator 216*a*. This estimation can be performed by the substance estimator 216*b* collating the characteristic Ch of the substance with the substance library LiS. At that time, two or more of the subclasses C3 may be estimated in descending order of the accuracy based on the accuracy (similarity degree) of the substance classified as the subclass C3 in the substance library LiS and the content of the constituent element estimated by the characteristic estimator 216*a*. Steps S803 to S805 are examples of an "analysis step" in the present embodiment.

In the subsequent step S806, the characteristic estimator 216*a* determines whether or not the analysis setting has been changed. The process proceeds to step S807 if the determination is YES, that is, the analysis setting has been changed, and proceeds to step S808 if the determination is NO, that is, the analysis setting has not been changed.

In step S807, the characteristic estimator 216*a* acquires the changed analysis setting from the analysis setting section 226*a* or the primary storage section 21*b*. Then, when the changed analysis setting is acquired, the characteristic estimator 216*a* returns to step S804 and re-estimates the characteristic Ch based on the changed analysis setting.

In step S808, it is determined whether or not to end the analysis. The analysis is ended if the determination is YES, and the process proceeds to step S806 if the determination is NO.

2. Generation of Image of Sample SP

—Illumination Setting Section 226*b*—

An illumination setting section 226*b* illustrated in FIG. 5 receives a setting of illumination conditions. The illumination conditions refer to control parameters related to the first camera 81, the coaxial illuminator 79 and the side illuminator 84, and control parameters related to the second camera 93, the second coaxial illuminator 94 and the second side illuminator 95. The illumination conditions include the amount of light of each illuminator, a lighting state of each illuminator, and the like.

—Illumination Controller 212—

The illumination controller 212 illustrated in FIG. 5 reads the illumination conditions set by the illumination setting section 226*b* from the primary storage section 21*b* or the secondary storage section 21*c*, and controls at least one of the coaxial illuminator 79, the side illuminator 84, the second coaxial illuminator 94, and the second side illuminator 95 so as to reflect the read illumination conditions. With this control, the illumination controller 212 can turn on at least one of the coaxial illuminator 79 and the side illuminator 84 or turn on at least one of the second coaxial illuminator 94 and the second side illuminator 95.

—Imaging Processor 213—

The imaging processor 213 illustrated in FIG. 5 receives an electrical signal generated by at least one camera of the first camera 81, the second camera 93, and the overhead camera 48, and generates the image P of the sample SP. The image P generated by the imaging processor 213 is output to the analysis history holding section 231 as one analysis data constituting the analysis record AR.

Figure 9A:
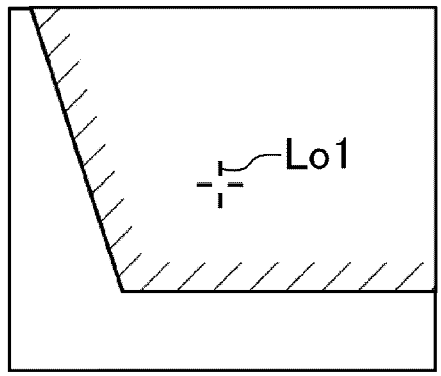
FIGS. 9A to 9C are views illustrating image display screens.
Figure 9B:
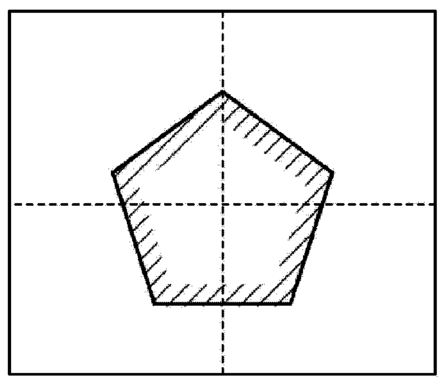
Figure 9C:
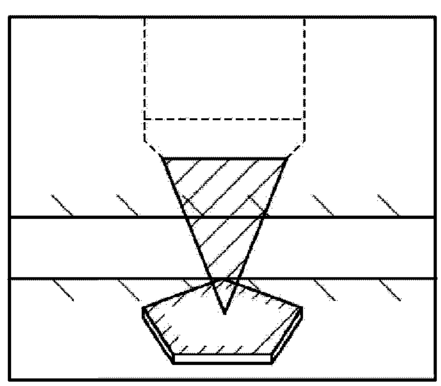

An example of the image P generated by the first camera 81 is illustrated in FIG. 9A among FIGS. 9A to 9C. The first camera 81 can observe the sample SP at a higher magnification than the second camera 93, which will be described later, in order to observe an analysis point of the sample SP in detail. When the sample SP is observed at a high magnification, the image P generated by the imaging processor 213 can be referred to as a high-magnification image if focusing on the magnification of the first camera 81. In this case, a visual field range of the first camera 81 (imaging visual field) is narrower than that of the second camera 93. Therefore, an image generated by the imaging processor 213 can be referred to as a narrow-area image when focusing on the visual field range (imaging visual field) of the first camera 81. Here, the names such as such the high-magnification image and the narrow-area image are used for the purpose of description, and the present embodiment is not limited thereto.

Note that the image captured by the first camera 81 may be referred to as a pre-irradiation image Pb or a post-irradiation image Pa depending on an imaging timing thereof. The pre-irradiation image Pb refers to the image P before the sample SP is irradiated with laser light, and the post-irradiation image Pa refers to the image P after the sample SP is irradiated with the laser light.

An example of the image P generated by the second camera 93 is illustrated in FIG. 9B among FIGS. 9A to 9C. The imaging section configured to capture an image of the sample SP is switched between the first camera 81 and the second camera 93 by the mode switcher 211 to be described later. The second camera 93 can observe the sample SP at a lower magnification than that of the first camera 81 in order to observe the entire sample SP. When the sample SP is observed at a low magnification, the image P generated by the imaging processor 213 can be referred to as a low-magnification image if focusing on the magnification of the second camera 93. In this case, a visual field range of the second camera 93 (imaging visual field) is wider than that of the first camera 81. Therefore, an image generated by the imaging processor 213 can be referred to as a wide-area image when focusing on the visual field range (imaging visual field) of the second camera 93.

Note that the wide-area image can also be generated based on the electrical signal generated by the first camera 81. As an example, the imaging processor 213 generates a high-magnification image based on the electrical signal generated by the first camera 81. Then, the imaging processor 213 generates a plurality of high-magnification images while changing relative positions of the first camera 81 and the sample SP. Then, the imaging processor 213 pastes the plurality of high-magnification images together based on a relative positional relationship between the first camera 81 and the sample SP at the time of generating one high-magnification image. As a result, the imaging processor 213 can also generate a wide-area image having a wider visual field range than the each of the high-magnification images.

An example of the image generated by the overhead camera 48 is illustrated in FIG. 9C among FIGS. 9A to 9C. A bird's-eye view image Pf in the present embodiment corresponds to the image P of the sample SP viewed from the side. Note that the overhead camera 48 is an example of the "second imaging section" in the present embodiment. Further, the bird's-eye view image Pf is an image having a wider visual field range (imaging visual field) than the high-magnification image generated based on the electrical signal generated by the first camera 81, and thus, can be classified as one of the above-described wide-area images.

That is, the wide-area image referred to in the present specification indicates at least one of the image P generated by pasting the plurality of high-magnification images together, the image P generated based on a light reception signal generated by the second camera 93, and the bird's-eye view images Pf generated by the overhead camera 48.

Further, the imaging processor 213 can calculate a distance to the analysis point of the sample SP based on a plurality of the images P obtained by changing a relative distance between the placement stage 5 and the first camera 81 or the second camera 93. The distance measured here is a distance to an irradiation position of laser light, and corresponds to an analysis depth to be described later. In a case where the analysis using the LIBS method is performed, the analysis point of the sample SP is dug by irradiation of the laser light. Therefore, a depth of the analysis point can be calculated for each irradiation of the laser light, and thus, the user can grasp which depth of the sample SP is being analyzed.

—Mode Switcher 211—

The mode switcher 211 illustrated in FIG. 5 switches from the first mode to the second mode or switches from the second mode to the first mode by advancing and retracting the analysis optical system 7 and the observation optical system 9 along the horizontal direction (the front-rear direction in the present embodiment). For example, the mode switcher 211 according to the present embodiment can switch to one of the second camera 93 and the first camera 81 by moving the observation housing 90 and the analysis housing 70 relative to the placement stage 5.

The mode switcher 211 can switch to one of the first camera 81 and the second camera 93 as the imaging section configured to capture the image of the sample SP. For example, the mode switcher 211 is set to the first camera 81 as the imaging section in the first mode, and is set to the second camera 93 as the imaging section in the second mode in the present embodiment.

Specifically, the mode switcher 211 according to the present embodiment reads, in advance, the distance between the observation optical axis Ao and the analysis optical axis Aa stored in advance in the secondary storage section 21*c*. Next, the mode switcher 211 operates the actuator 65*b* of the slide mechanism 65 to advance and retract the analysis optical system 7 and the observation optical system 9.

<Flow of Performing Image Generation and Component Analysis of Sample SP>

Figure 10:
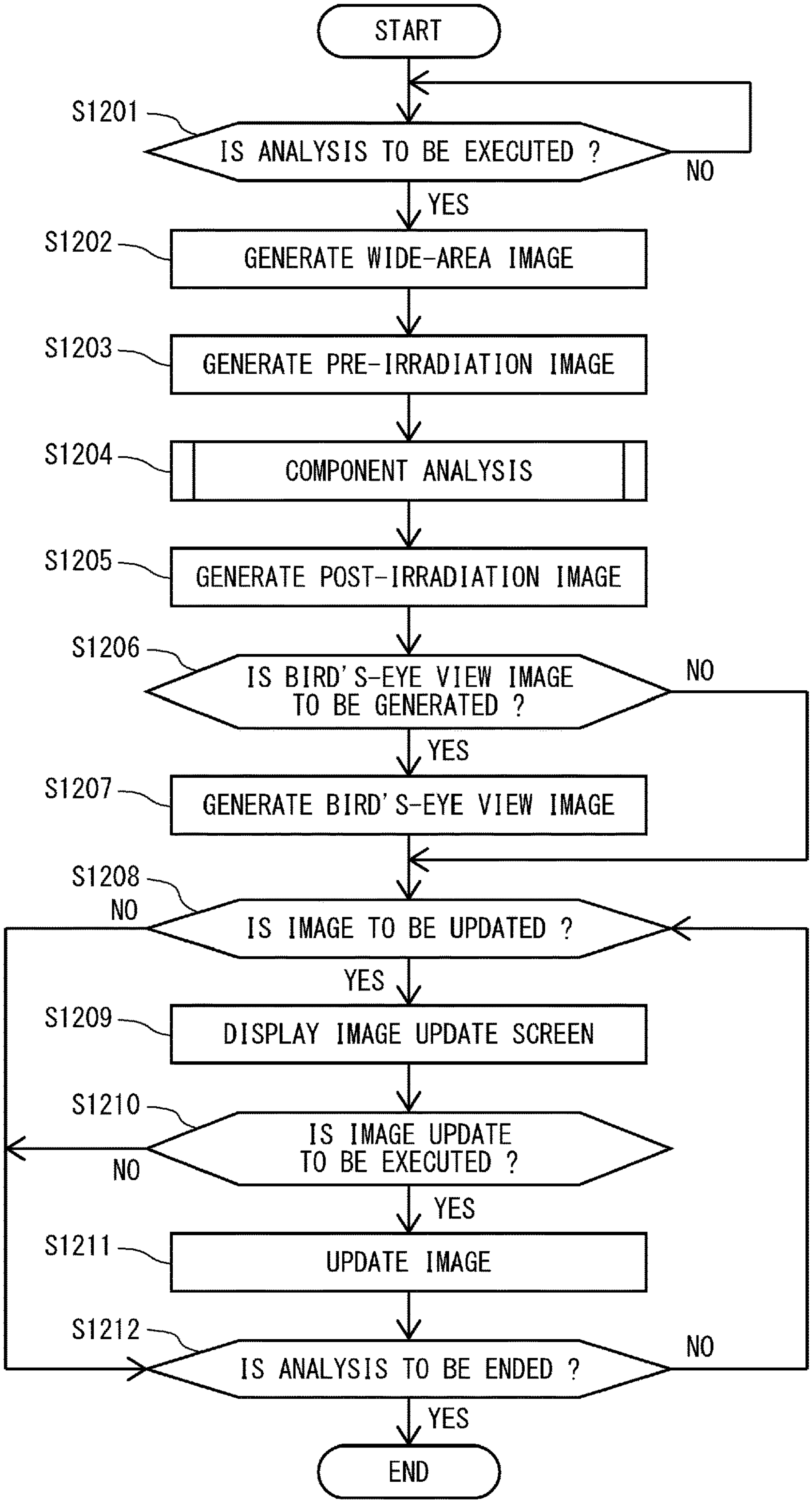
FIG. 10 is a flowchart illustrating a sample analysis procedure by the controller.

A process of capturing an image of the sample SP and generating the image P and a process of performing the component analysis of the sample SP will be described with reference to a flowchart of FIG. 10.

First, in step S1201, the input receiver 221*b* determines whether or not an operation for executing analysis has been performed, the control process proceeds to step S1202 in the case of YES in this determination, and the determination in S1201 is repeated in the case of NO.

Subsequently, in step S1202, the imaging processor 213 generates a wide-area image. The wide-area image may be generated by pasting a plurality of high-magnification images together based on a light reception signal generated by the first camera 81, or may be generated based on a light reception signal generated by the second camera 93.

Subsequently, in step S1203, the imaging processor 213 generates the pre-irradiation image Pb of the sample SP. The pre-irradiation image Pb is generated based on an electrical signal generated by the first camera 81 or the second camera 93.

Subsequently, in step S1204, the component analysis of the sample SP is performed. A procedure of the component analysis of the sample SP is the same as that in FIG. 8.

Subsequently, in step S1205, the imaging processor 213 generates the post-irradiation image Pa of the sample SP. The post-irradiation image is generated based on an electrical signal generated by the first camera 81. Subsequently, in step S1206, the input receiver 221*b* determines whether or not an operation for capturing the bird's-eye view image Pf has been performed, and the control process proceeds to step S1207 in the case of YES in this determination and proceeds to step S1212 in the case of NO.

In step S1207, the imaging processor 213 generates the bird's-eye view image Pf. The bird's-eye view image Pf is generated based on an electrical signal generated by the overhead camera 48.

Subsequently, in step S1208, the input receiver 221*b* determines whether or not an operation for updating the image P has been performed, and the control process proceeds to step S1209 in the case of YES in this determination and proceeds to step S1212 in the case of NO.

Figure 11:
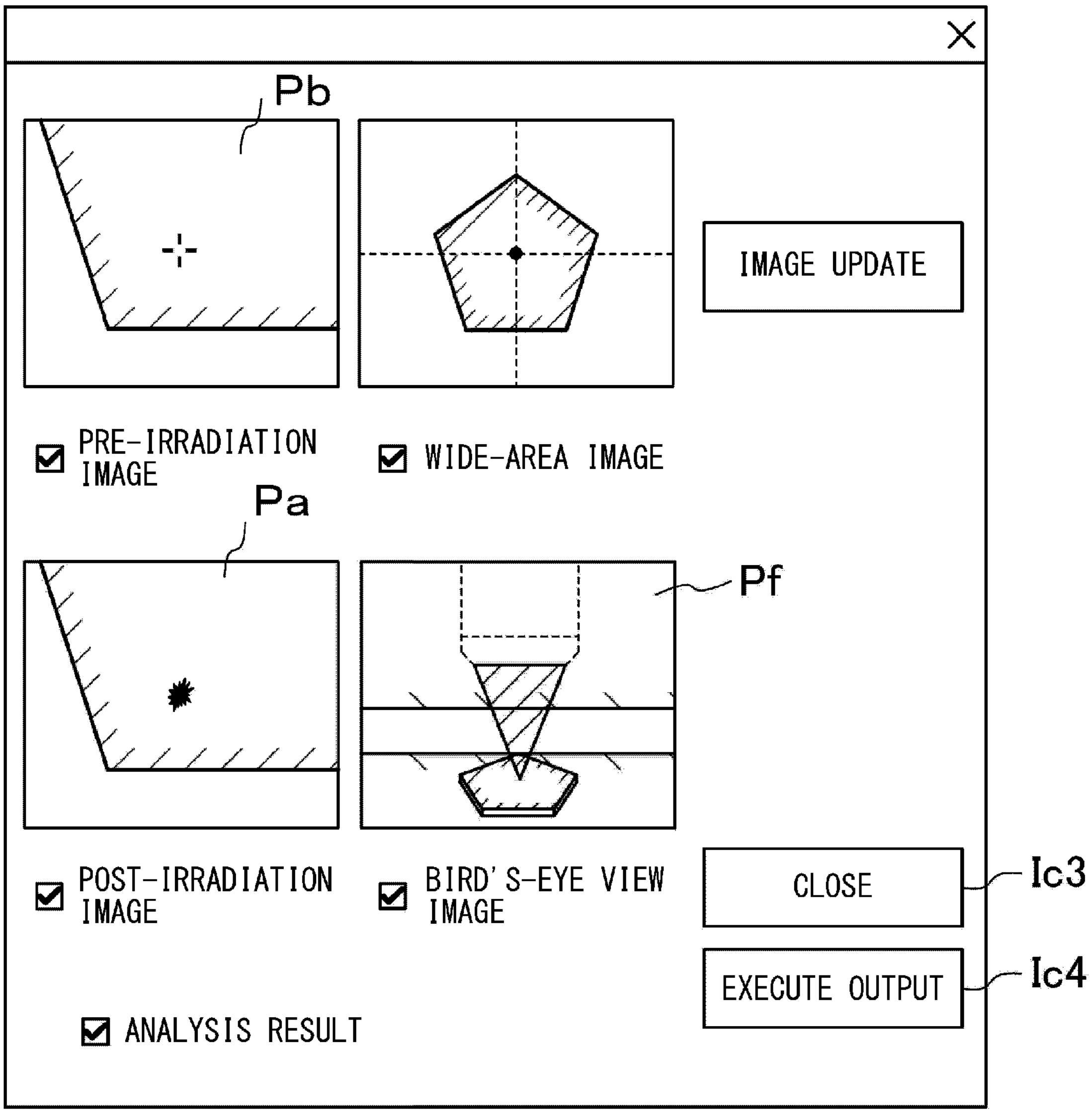
FIG. 11 is a view for describing an output image selection screen.

When the operation for updating the image P has been performed in step S1208, the display controller 221*a* causes the display 22 to display an output image selection screen as illustrated in FIG. 11 in step S1209. Then, the input receiver 221*b* receives selection of one image from the image P displayed on the output image selection screen.

In the subsequent step S1210, the input receiver 221*b* detects whether or not the operation for updating the image P has been performed, and the control process proceeds to step S1211 in the case of YES in this determination and proceeds to step S1212 in the case of NO.

In step S1211, the imaging processor 213 updates the image selected on the output image selection screen.

Subsequently, in step S1212, it is determined whether or not to end the analysis. The analysis is ended if the determination is YES, and the process returns to step S1208 if the determination is NO.

3. Analysis of Sample SP in Depth Direction

In the above description, the method of emitting the laser light which is the electromagnetic wave to the sample SP and estimating the substance at the position of the sample SP irradiated with the electromagnetic wave has been described. In the present embodiment, it is also possible to analyze the sample SP in a depth direction by emitting laser light, which is an electromagnetic wave, a plurality of times to substantially the same position of the sample SP. Since the sample SP is analyzed in the depth direction by digging substantially the same portion of the sample SP, the analysis of the sample SP in the depth direction is referred to as drilling.

Figure 12:
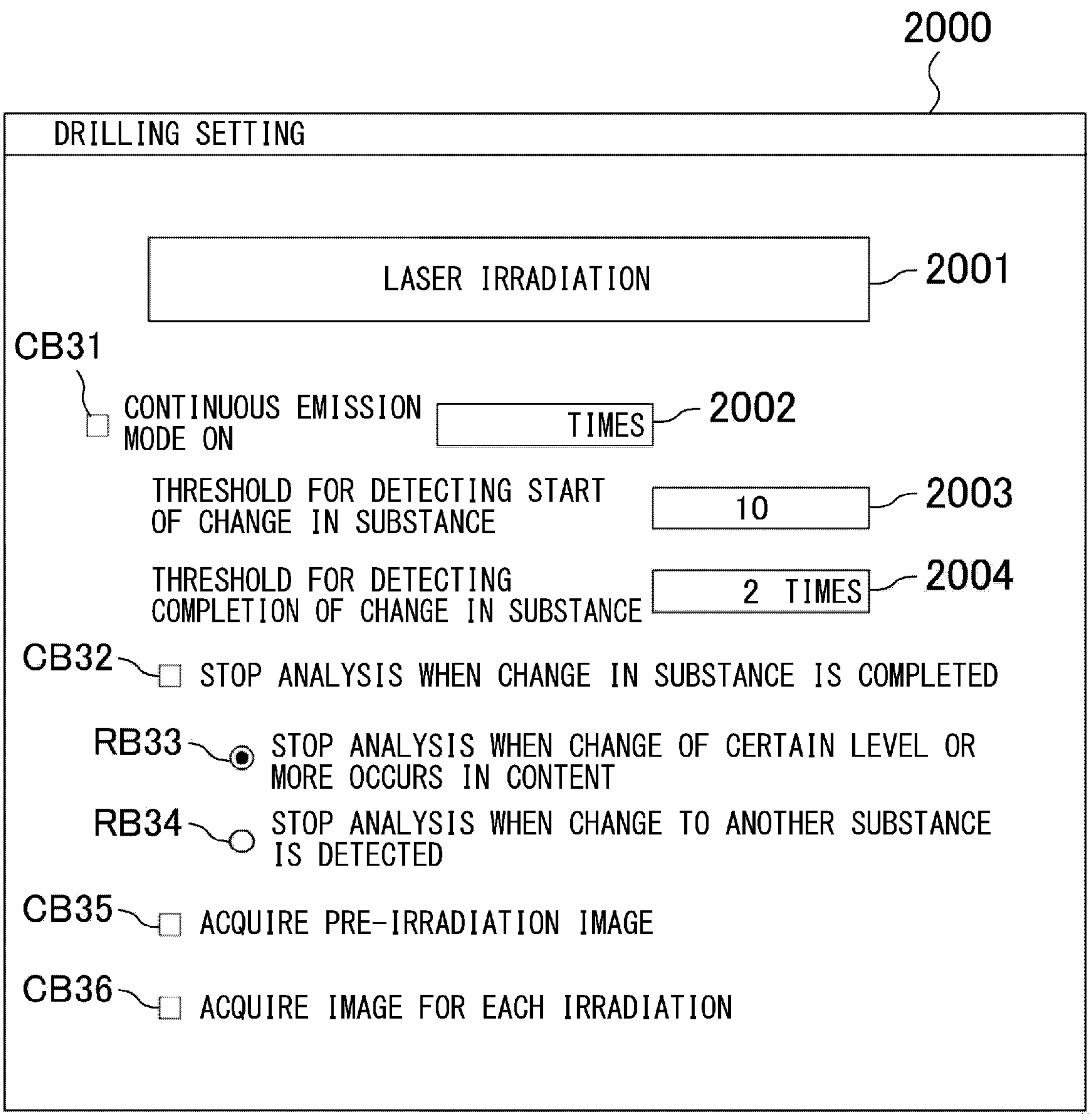
FIG. 12 is a view for describing a drilling setting screen.

FIG. 12 illustrates a drilling setting screen 2000 for the user to perform various settings at the time of analyzing the sample SP in the depth direction. The drilling setting screen 2000 includes: a laser irradiation button 2001; a check box CB31 for selecting whether or not to enable a continuous emission mode; a number-of-times-of-continuous-emission input field 2002; a change start threshold setting field 2003 for setting a threshold for detecting a start of a change in a substance; a change completion threshold setting field 2004 for setting a threshold for detecting completion of a change in a substance; a check box CB32 for selecting whether or not to stop analysis when a change in a substance is completed; radio buttons RB33 and RB34 for setting analysis stop conditions; a check box CB35 for selecting whether or not to store an image before analysis; and a check box CB36 for selecting whether or not to store an image for each irradiation of laser light which is an electromagnetic wave. Parameters set on the drilling setting screen 2000 are set by the above-described analysis setting section 226*a*. That is, the analysis setting section 226*a* receives settings of various parameters related to drilling such as the number of times of emission of laser light, a change start threshold, and a change completion threshold.

The laser irradiation button 2001 is a button for executing laser irradiation in order to perform component analysis of the sample SP. A trigger signal for executing the laser irradiation is input to the emission controller 214.

The check box CB31 is a check box for selecting whether or not to enable the continuous emission mode. Further, the number-of-times-of-continuous-emission input field 2002 is an input field for inputting the number of times of emission of laser light which is an electromagnetic wave. When the continuous emission mode is enabled, the emission controller 214 controls the emitter 71 to emit laser light, which is an electromagnetic wave, until the number of times of emission input in the number-of-times-of-continuous-emission input field 2002 is satisfied. That is, the number of times of emission input in the number-of-times-of-continuous-emission input field 2002 is set as a laser stop condition, which is a condition for stopping the emission of laser light, and the emission controller 214 generates a laser light emission permission signal so as to emit the laser light until the laser stop condition is satisfied.

The change start threshold setting field 2003 is a setting field for setting a threshold for detecting a start of a change in a substance. Further, the change completion threshold setting field 2004 is a setting field for setting a threshold for detecting completion of a change in a substance. Although details will be described later, the component analysis section 216 can detect whether or not there is a change in a substance estimated by emitting laser light. Setting fields for setting conditions for detection of such a change are the change start threshold setting field 2003 and the change completion threshold setting field 2004.

In the example illustrated in FIG. 12, when there is a change of 10 or more set in the change start threshold setting field 2003 in a content of any element, which is a constituent element of a substance, the component analysis section 216 detects that a change from one substance to another substance has started. Then, the component analysis section 216 estimates that the substance is an "intermediate substance" indicating that the substance is changing from one substance to another substance. Further, when the substance estimated by emitting the laser light is identical twice or more, which is the number of times set in the change completion threshold setting field 2004, the component analysis section 216 determines that the change from one substance to another substance has been completed, and identifies the substance after the change as the substance. Here, the intermediate substance can also be automatically estimated in consideration of the degree of mismatching with a substance in the substance library LiS and the degree of matching with a composite substance having a multilayer structure in the composite substance library LiM. That is, the component analysis section 216 collates a constituent element constituting an analyte and a content of the constituent element with the substance library LiS. Then, when a matching degree between a constituent element of one substance included in the substance library and a content of the constituent element of the substance included in the substance library, and a constituent element constituting the analyte and a content of the constituent element constituting the analyte is equal to or less than a predetermined threshold (when there is no substance having a matching degree equal to or more than the threshold) for each of the substances included in the substance library, the component analysis section 216 can estimate that the analyte is the intermediate substance that is changing from one substance to another substance. Note that a substance can be estimated according to the magnitude of a matching degree when the matching degree between a constituent element constituting the analyte and a content of the constituent element, and the substance included in the substance library exceeds the predetermined threshold.

The check box CB32 is a check box for selecting whether or not to stop the analysis when the change in the substance is completed. There is a case where component analysis results obtained by irradiating the sample SP with laser light a plurality of times change when the continuous emission mode is enabled. In such a case, the analysis can be stopped in a case where a change from one substance to another substance has started or a case where a change from one substance to another substance has been completed. That is, the component analysis section 216 outputs a stop signal for stopping the emission of laser light to the emission controller 214 when detecting that a predetermined analysis stop condition, such as the start of the change in the substance or the completion of the change in the substance, is satisfied. Here, even if the number of times of emission of laser light is less than the number of times of emission set on the drilling setting screen, the stop signal is generated in a case where the predetermined analysis stop condition is satisfied, such as the case where the change from one substance to another substance has started or the case where the change from one substance to another substance is completed.

The radio button RB33 and the radio button RB34 are radio buttons for selecting under which condition the analysis is to be stopped. The analysis stop condition can be changed according to switching of the radio button RB33 or the radio button RB34. The radio button RB33 is the radio button for setting to stop the analysis when a change of a certain level or more occurs in a content of an element. That is, a change in content can be set as the analysis stop condition. In this case, when a change equal to or more than a threshold set in the change start threshold setting field 2003 occurs in a content of at least one element constituting a substance, the component analysis section 216 determines that the change of the certain level or more has occurred in the content, and generates the stop signal for causing the emission controller 214 to stop the emission of laser light which is an electromagnetic wave. Further, the radio button RB34 is the radio button for setting to stop the analysis when a change to another substance is detected. That is, a change in a substance can be set as the analysis stop condition. In this case, when the same substance is continuously estimated the number of times set in the change completion threshold setting field 2004, the component analysis section 216 determines that the change to another substance is completed, and generates the stop signal for causing the emission controller 214 to stop the emission of laser light which is an electromagnetic wave.

Further, when the analysis stop condition is set by selecting the check box CB32, the emission controller 214 can determine whether the laser stop condition is satisfied based on the number of times of emission input in the number-of-times-of-continuous-emission input field 2003 and the analysis stop condition. That is, when the number of times of emission of an electromagnetic wave after the start of the analysis based on the setting set on the drilling setting screen is less than the number of times input in the number-of-times-of-continuous-emission input field 2003 and the analysis stop condition is not satisfied, the emission controller 214 generates a laser light emission signal for causing the emitter 71 to emit laser light. Further, when the analysis stop condition is satisfied, that is, when it is estimated that the change to another substance has been completed, the emission controller 214 generates the stop signal for causing the emitter 71 to stop the emission of laser light even if the number of times of emission of laser light after the start of analysis based on the setting set on the drilling setting screen is less than the number of times of emission input in the number-of-times-of-continuous-emission input field 2002 at the estimation time point. As a result, the emission of the laser light, which is the electromagnetic wave, from the emitter 71 can be permitted while the number of times of emission of laser light after the start of analysis based on the setting set on the drilling setting screen is less than the number of times of emission input in the number-of-times-of-continuous-emission input field 2002 until the component analysis section 216 estimates that the change from one substance to another substance has been completed. In other words, when the number of times of emission of laser light after the start of the analysis is equal to or more than the number of times input in the number-of-times-of-continuous-emission input field 2002 or when it is estimated that the change from one substance to another substance has been completed, the emission controller 214 determines that the laser stop condition is satisfied for the emitter 71, and generates a stop signal for stopping the emission of the laser light, which is the electromagnetic wave, from the emitter 71.

As a result, the stop signal can be generated when the analysis stop condition is satisfied even in the case where the number of times of emission of laser light is less than the number of times of emission set on the drilling setting screen, that is, in a state where the laser light can be emitted. The analysis method using the LIBS method is destructive analysis, but it is possible to complete the analysis with the minimum number of times necessary without destroying a portion other than the sample SP due to unintended laser light emission.

The check box CB35 is a check box for selecting whether or not to acquire the image P before analysis. In a case where the check box CB35 is selected, the imaging processor 213 is driven to generate the image P before analysis of the sample SP (pre-irradiation image Pb) before the laser light emission signal is generated for the emission controller 214 when the input receiver **221*b* detects that an instruction to start analysis from the user has been received. The image of the sample SP generated here may be an image captured by the first camera 81 as the imaging section or an image captured by the second camera 93 as the second imaging section. In a case where the sample SP is captured by the first camera 81, the sample SP can be observed at a higher magnification. Further, the first camera 81 is arranged in the same housing as the analysis optical system related to the component analysis of the sample, and thus, the image generation and the analysis can be performed seamlessly. In a case where the sample SP is captured by the second camera 93**, a wide range of the sample SP can be captured, and thus, a wide-area image of the sample SP can be obtained.

The analysis method using the LIBS is a method of irradiating the sample SP with laser light which is an electromagnetic wave and detecting plasma light generated by the irradiation, and is classified into destructive analysis. In the destructive analysis, a scratch or a hole such as a crater sometimes occurs when the sample SP is analyzed. Therefore, a state before the analysis can be recorded by automatically capturing the pre-irradiation image Pb which is the image P before the analysis of the sample SP.

The check box CB36 is a check box for selecting whether or not to acquire an image for each emission of laser light. In a case where the check box CB36 is selected, the input receiver **221*b* generates the emission signal of the laser light, which is the electromagnetic wave, for the emission controller 214. Then, the imaging processor 213 is driven every time the emitter 71** irradiates the sample SP with the laser light, whereby a plurality of the images P of the sample SP are generated. Since the analysis using the LIBS is the destructive analysis as described above, it may be configured such that the change in the sample SP according to the emission of the laser light can be observed by acquiring the image P every time the sample SP is irradiated with the laser light. Then, it is possible to obtain color information of the analysis point at each analysis depth, which is advantageous for confirmation and consideration of the component analysis result. Further, it is difficult for illumination light to reach a deep portion, and thus, image processing such as HDR or optimization of illumination can also be executed every time based on the luminance of the analysis point. Further, it is also possible to obtain a focus position of a bottom portion of the analysis point from blur information of an image for each irradiation and measure the analysis depth at which the analysis is actually performed.

<Detection of Change in Substance>

As described above, the component analysis section 216 can detect whether or not there is a change in a substance estimated by emitting the laser light which is the electromagnetic wave. A method for detecting this change will be described with reference to FIG. 13.

FIG. 13 is a view displaying a list of component analysis results at a plurality of positions different in the depth direction of the sample SP, obtained by irradiating substantially the same point of the sample SP with laser light, which is an electromagnetic wave, a plurality of times.

The leftmost column indicates the number of times of irradiation of laser light. When the sample SP is irradiated with laser light, a creater-shaped hole is generated in the sample SP. When substantially the same point of the sample SP is irradiated with the laser light a plurality of times, the sample SP is dug in the depth direction. Therefore, the emitter 71 emits the laser light to a plurality of positions having different analysis depths that are depths at which the sample SP is irradiated with the laser light. In a table illustrated in FIG. 13, the vertical direction of the table coincides with the depth direction of the sample. That is, a component analysis result obtained for the first time corresponds a component analysis result of the surface of the sample SP. Then, the component analysis is performed on a point having a deeper analysis depth from the surface of the sample SP as the number of times of irradiation increases. Therefore, a component analysis result in the lower part of the table corresponds to a component analysis result of a point having a deeper analysis depth from the surface of the sample SP. Here, for the sake of description, a depth of the sample SP irradiated with the laser light, which is the electromagnetic wave, for the first time is referred to as a first analysis depth, and a depth of the sample SP irradiated with the laser light for the second time is referred to as a second analysis depth. Similarly, a depth of the sample SP irradiated with the laser light for the Nth time is referred to as an Nth analysis depth. Note that such names are for the purpose of description, and a depth of the sample SP irradiated with the laser light for the third time may be referred to as the first analysis depth, and a depth of the sample SP irradiated with the laser light for the tenth time may be referred to as the second analysis depth. That is, the names such as the first, second, . . . , and Nth analysis depths indicate the relative relationship of the analysis depths, and it suffices that the analysis depths become deeper in this order.

The component analysis result at the first analysis depth is estimated to be Cr: 100% by the characteristic estimator 216*a*. Therefore, the substance estimator 216*b* estimates Cr as the substance at the first analysis depth. The substance at the second analysis depth is similar to the substance at the first analysis depth.

The component analysis result at the third analysis depth is estimated to be Cr: 97% and Ni: 3% by the characteristic estimator 216*a*. From the component analysis result at the second depth, which is the immediately previous component analysis result, a content of Cr has decreased by 3%, and a content of Ni has increased by 3%. That is, the content of any constituent element included in at least one of the component analysis result at the second analysis depth and the component analysis result at the third analysis depth has not changed by 10, which is the threshold set in the change start threshold setting field 2003, or more. Therefore, the substance estimator 216*b* estimates Cr, which is the same as the immediately previous substance, as the substance at the third analysis depth.

The component analysis result at the fourth analysis depth is estimated to be Cr: 70% and Ni: 30% by the characteristic estimator 216*a*. From the component analysis result at the third depth, which is the immediately previous component analysis result, a content of Cr has decreased by 27%, and a content of Ni has increased by 27%. That is, the content of the constituent element included in at least one of the component analysis result at the fourth analysis depth and the component analysis result at the third analysis depth has changed by 10, which is the threshold set in the change start threshold setting field 2003, or more. Therefore, the substance estimator 216*b* estimates that the substance at the fourth analysis depth is the intermediate substance that is changing from one substance to another substance. Note that the case of being estimated to be the intermediate substance has been described herein, but Cr, which is the substance at the third analysis depth, may be estimated as the substance at the fourth analysis depth. That is, the substance at the immediately previous analysis depth can be estimated as the substance at the fourth analysis depth. Further, in a case where the radio button RB33 is selected and the analysis is stopped when a change of a certain level or more occurs in the content, the component analysis is stopped with the component analysis at the fourth analysis depth.

The component analysis result at the fifth analysis depth is estimated to be Cr: 20% and Ni: 80% by the characteristic estimator 216*a*. Therefore, the substance estimator 216*b* can estimate that the substance at the fifth analysis depth is a nichrome wire. Further, the substance estimator 216*b* can also estimate the substance at the fifth analysis depth based on the component analysis result at the sixth analysis depth.

The component analysis result at the sixth analysis depth is estimated to be Cr: 5% and Ni: 95% by the characteristic estimator 216*a*. In a case where two is set as the threshold for detecting that the change from one substance to another substance is completed in the change completion threshold setting field 2004, it is detected that the change has been completed when the same substance is estimated twice or more by the substance estimator 216*b*. The substance at the sixth analysis depth is estimated to be Ni based on the component analysis result, but the substance at the fifth analysis depth and the substance at the sixth analysis depth are different. Therefore, the same substance is not estimated twice, which is the threshold set in the change completion threshold setting field 2005, or more. In this case, the substance estimator 216*b* can estimate that the substances at the fifth analysis depth and the sixth analysis depth are intermediate substances that are changing from Cr as one substance to another substance. That is, the substance estimator 216*b* can consider the component analysis result at the position deeper than the fifth analysis depth to estimate the substance at the fifth analysis depth.

The component analysis result at the seventh analysis depth is estimated to be Ni: 100% by the characteristic estimator 216*a*. Therefore, the substance estimator 216*b* estimates Ni as the substance at the seventh analysis depth. In this case, the substance at the sixth analysis depth and the substance at the seventh analysis depth are the same, and the same substance has been estimated twice, which is the threshold set in the change completion threshold setting field 2004, or more. Therefore, the substance estimator 216*b* estimates Ni as the substance at the seventh analysis depth. Note that the substance estimator 216*b* may re-estimate that the substance at the sixth analysis depth is Ni since the substance at the sixth analysis depth and the substance at the seventh analysis depth are the same.

Although details are omitted, component analysis results and substances at the eighth and subsequent analysis depths are as illustrated in FIG. 13. Further, the analysis depth can also be obtained for each component analysis as described above. In this case, the analysis depth calculated by the imaging processor 213 can also be displayed during the display of the list of the component analysis results illustrated in FIG. 13.

As described above, when contents of constituent elements of the substance at the first analysis depth and contents of constituent elements of the substance at the second analysis depth, deeper than the first analysis depth, are different by the predetermined threshold set in the change start threshold setting field 2003 or more, the component analysis section 216 can estimate that the change from one substance at the first analysis depth to another substance has started, and estimate that the substance at the second analysis depth is the intermediate substance indicating the "substance that is changing". Note that, in this case, the same substance as the substance at the first analysis depth can be estimated, instead of the "intermediate substance", as the substance at the second analysis depth.

Further, the component analysis section 216 can estimate the substance at the third analysis depth, deeper than the second analysis depth, based on the substance at the fourth analysis depth, deeper than the third analysis depth, and the predetermined threshold set in the change completion threshold setting field 2004. That is, in the case where the value of two or more is set as the threshold in the change completion threshold setting field 2004, the component analysis section 216 estimates that the substance at the third analysis depth is the intermediate substance when the substance at the third analysis depth and the substance at the fourth analysis depth are different.

As a result, even when a component analysis result coincides with a component analysis result of the third substance different from one substance and another substance during the change from the one substance to the another substance, whether the third substance actually exists or the third substance is temporarily detected can be determined, and the substance can be estimated more appropriately.

Further, the component analysis section 216 can estimate the substance at the fourth analysis depth based on the substance at the third analysis depth, shallower than the fourth analysis depth, and the predetermined threshold set in the change completion threshold setting field 2004. That is, in the case where two is set as the threshold in the change completion threshold setting field 2004, the component analysis section 216 estimates that the change from one substance to another substance has been completed when the substance at the third depth and the substance at the fourth analysis depth coincide. Then, a substance corresponding to the component analysis result obtained at the fourth analysis depth is estimated as the substance at the fourth analysis depth. In a case where a value larger than two is set as the threshold in the change completion threshold setting field 2004, it is estimated that the change from one substance to another substance has been completed when the same substance is continuously estimated for a threshold number of times or more.

As a result, a substance at a predetermined analysis depth is estimated based on substances estimated at immediately previous and subsequent analysis depths, and thus, it is possible to determine whether the third substance actually exists or the third substance is temporarily detected and more appropriately estimate that the change from one substance to another has been completed even when the component analysis result coincides with the component analysis result of the third substance different from the one substance and the another substance during the change from the one substance to the another substance, —Composite Substance Estimator 217—

The composite substance estimator 217 illustrated in FIG. 5 estimates a composite substance of the sample SP based on the substance estimated by the component analysis section 216 and the composite substance library LiM held in the library holding section 232. In a case where the sample SP is a composite substance in which the top of a substrate is coated with predetermined metal, it is sometimes difficult to accurately grasp properties of the sample SP only by estimating a substance. Therefore, the substance estimator 216*b* estimates a substance of the sample SP a plurality of times. Then, the composite substance estimator 217 estimates a name of the composite substance of the sample SP based on the substances estimated a plurality of times. As a result, the user can grasp the name of the composite substance of the sample SP, and the sample SP can be more appropriately evaluated. The composite substance library LiM will be described with reference to FIG. 14.

The composite substance library LiM is a library in which a name of a composite substance and configuration information of a plurality of substances constituting the composite substance are stored in association with each other. Here, an example of the configuration information is an order in the depth direction of a plurality of substances constituting one composite substance. Further, depth information in the composite substance may be included for each of the plurality of substances. Further, instead of the substance or in addition to the substance, the configuration information may be constructed by a superclass or an intermediate class which is information for identifying the substance. That is, in the example illustrated in FIG. 14, a name of a composite substance and a plurality of substances constituting the composite substance are associated with each other for materials of the composite substance classified into a steel sheet and brass. The composite substance library LiM is read by the library reader 225 illustrated in FIG. 5.

For example, the composite substance library LiM includes a galvanized steel sheet classified as the steel sheet. Configuration information of the galvanized steel sheet includes Zn plating and steel, and the configuration information is associated with the galvanized steel sheet which is a name of a composite substance. The configuration information of one composite substance may include a plurality of substances constituting one composite substance from the surface to the underlayer of the one composite substance. That is, since the galvanized steel sheet is obtained by applying Zn plating on steel, zinc is detected from the surface of a sample, and steel is detected as the analysis depth becomes deeper. In such a case, the Zn plating and the steel may be associated in this order. In order to associate the Zn plating and the steel in this order, the Zn plating is associated with Constituent Substance 1, and the steel is associated with Constituent Substance 2 as substances or information for identifying substances constituting one composite substance in FIG. 14.

Further, the composite substance library LiM includes a nickel plated steel sheet classified as the steel sheet. Configuration information of the nickel plated steel sheet includes Ni plating and steel, and the configuration information is associated with the nickel plated steel sheet which is a name of a composite substance. Similarly to the galvanized steel sheet, the Ni plating is associated with Constituent Substance 1 and the steel is associated with Constituent Substance 2 to associate a plurality of substances in order from the surface of the composite substance to the underlayer.

Further, the composite substance library LiM includes nickel chromium plated brass classified as the brass. Configuration information of the nickel chromium plated brass includes Cr plating, Ni plating, and brass, and this configuration information is associated with the nickel chromium plated brass which is a name of a composite substance. Similarly to the galvanized steel sheet, the Cr plating is associated with Constituent Substance 1, the Ni plating is associated with Constituent Substance 2, and the brass is associated with Constituent Substance 3 to associate a plurality of substances in order from the surface of the composite substance to the underlayer.

In this manner, the composite substance library LiM holds data in which a name of a composite substance having different substances in the depth direction from the surface of the composite substance to the underlayer is associated with configuration information of the plurality of substances constituting the composite substance. Then, the composite substance estimator 217 can estimate the name of the composite substance of the sample SP based on the composite substance library LiM and the substances at the respective analysis depths estimated by the substance estimator 216*b*, the substances being irradiated with laser light at a plurality of positions having different analysis depths by the emitter 71. That is, the composite substance estimator 217 can estimate not only the substances at specific analysis depths irradiated with the laser light but also the name of the composite substance of the sample SP based on the information for identifying the substances at the plurality of positions having different analysis depths. In the case of FIG. 13, Cr, Ni, and brass exist from the surface to the underlayer of the sample SP. Therefore, the composite substance estimator 217 estimates that the composite substance of the sample SP is the nickel chromium plated brass based on the composite substance library LiM. Since Cr and Ni are plated in the case of the nickel chromium plated brass, the Cr plating and the Ni plating are estimated in a result display area 3020 illustrated in FIG. 16C to be described later.

Further, in the composite substance library LiM, a name of a composite substance, configuration information of a plurality of substances constituting the composite substance, and depth information of the substances in the composite substance may be associated with each other. In this case, the composite substance estimator 217 can more accurately identify a composite substance by identifying a name of the composite substance based on substances estimated at a plurality of positions having different analysis depths, the analysis depths which are irradiation positions of laser light calculated by the imaging processor 213, and the composite substance library held in the library holding section.

Since the name of the composite substance of the sample SP is estimated based on the information for identifying the substances at the plurality of analysis depths, even the user who is not familiar with analysis can easily grasp the properties of the sample SP, which leads to improvement of usability.

—Composite Substance Registering Section 218—

The composite substance registering section 218 can register a new composite substance in the composite substance library LiM in a case where it is difficult to estimate a name of a composite substance of the sample SP based on substances at the respective analysis depths or information for identifying the substances estimated by the substance estimator 216*b*, that is, in a case where the name of the composite substance corresponding to the distribution of the substances in the depth direction of the sample SP or the distribution of the information for identifying the substances in the depth direction of the sample SP is not registered in the composite substance library LiM. For example, when the name of the composite substance of the sample SP has not been estimated by the composite substance estimator 217, the display controller 221*a* can display an error screen notifying that identification of the composite substance has failed on the display 22. On this error screen, the input receiver 221*b* receives selection as to whether or not to register a new composite substance. When the input receiver 221*b* receives registration as the new composite substance, the composite substance registering section 218 registers a name of a composite substance input by the user and configuration information based on the substances at the respective analysis depths estimated by the substance estimator 216*b* in the substance library LiM in association with each other. Since the composite substance registering section 218 registers the new composite substance in the composite substance library LiM, it is possible to identify a composite substance for the composite substance that has been analyzed even once. As a result, the appropriate composite substance library LiM can be constructed according to the user environment.

<Flowchart of Drilling>

Figure 15:
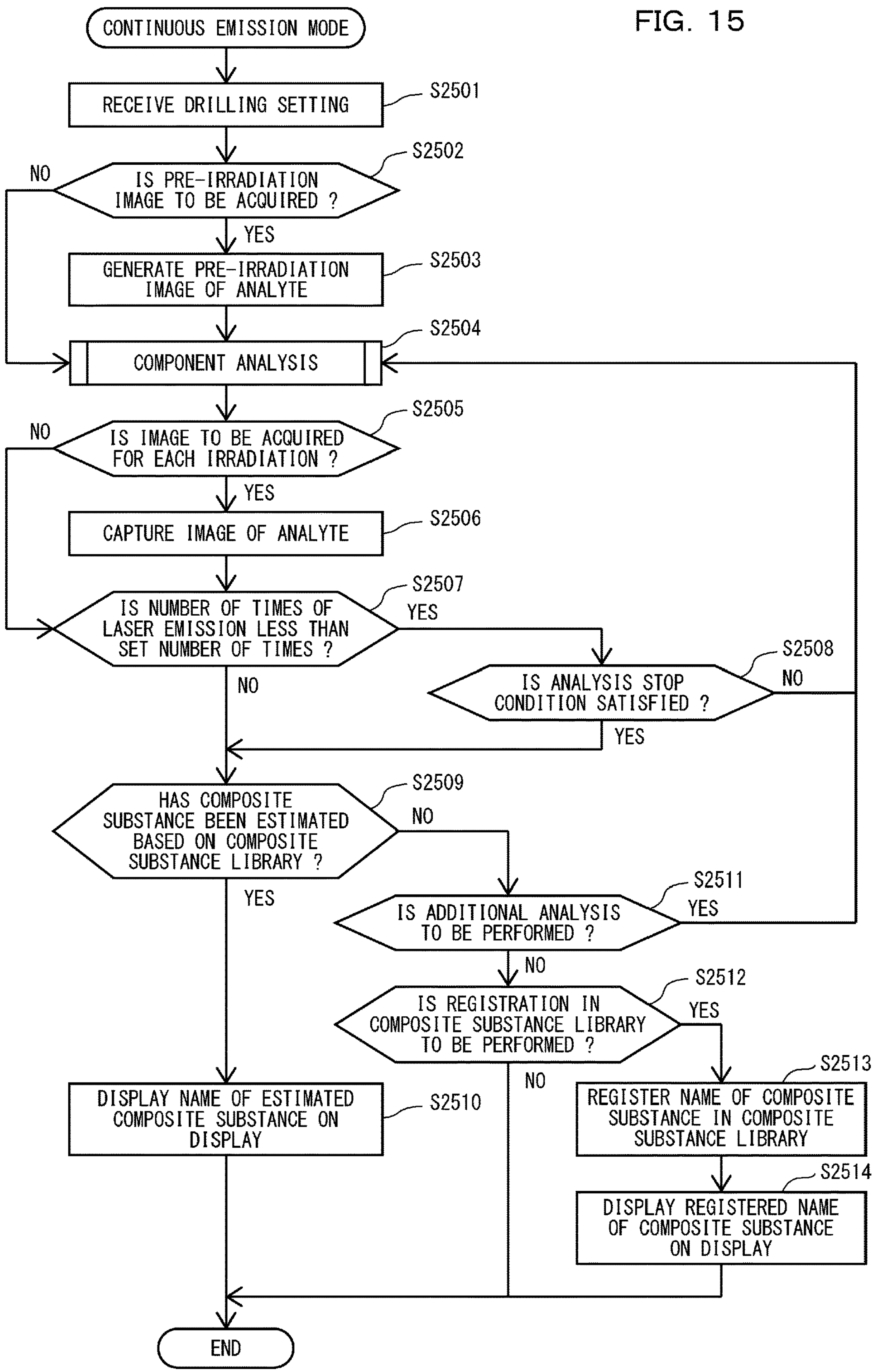
FIG. 15 is a flowchart illustrating a drilling procedure by the controller.

A method of performing the drilling which is the analysis in the depth direction of the sample SP will be described with reference to a flowchart of FIG. 15.

First, in step S2501, the analysis setting section 226*a* receives a drilling setting. The drilling setting is set, for example, as the display controller 221*a* displays the drilling setting screen 2000 as illustrated in FIG. 12 on the display 22, and the input receiver 221*b* receives an input by the user on the drilling setting screen 2000.

Next, the analysis setting section 226*a* determines whether or not to acquire the pre-irradiation image Pb in step S2502. This determination can be made, for example, based on whether or not the check box CB35 for acquiring a pre-irradiation image is selected on the drilling setting screen 2000. The control process proceeds to step S2503 in the case of YES in this determination, and step S2503 is skipped and the control process proceeds to step S2504 in the case of NO.

In step S2503, the imaging processor 213 generates a pre-irradiation image of the sample SP. The pre-irradiation image of the sample SP may be an image in which the sample SP is captured by the first camera 81 or an image in which the sample SP is captured by the second camera 93.

Subsequently, in step S2504, the component analysis of the sample SP is performed. This step is similar to the flowchart of FIG. 8.

Next, the analysis setting section 226*a* determines whether or not to acquire the image P every time the sample SP is irradiated with laser light by the emitter 71 in step S2505. This determination can be made, for example, based on whether or not the check box CB36 for acquiring the image P for each irradiation is selected on the drilling setting screen 2000. The control process proceeds to step S2506 in the case of YES in this determination, and step S2506 is skipped and the control process proceeds to step S2507 in the case of NO.

In step S2506, the imaging processor 213 generates an image of the sample SP. The image of the sample SP may be an image in which the sample SP is captured by the first camera 81 included in the analysis housing that accommodates the analysis optical system that is the optical system for performing the component analysis. Further, the imaging processor 213 can obtain a depth of a bottom portion of an analysis point by searching for a focused point in step S2506.

Next, the emission controller 214 determines whether or not the number of times of emission of laser light, which is an electromagnetic wave, from the emitter 71 is less than the number of times input in the number-of-times-of-continuous-emission input field 2002 in step S2507. The control process proceeds to step S2508 in the case of YES in this determination, and the control process proceeds to step S2509 in the case of NO.

In step S2508, the component analysis section 216 determines whether or not a analysis stop condition such as a start of a change in a substance or completion of a change in a substance is satisfied. This determination may be made only in a case where the check box CB32 for stopping the analysis is selected on the drilling setting screen 2000 when the change in the substance is completed and the analysis stop condition is set as the drilling setting. The control process proceeds to step S2509 in the case of YES in this determination, and the control process returns to step S2504 to perform the component analysis again in the case of NO.

Next, the composite substance estimator 217 determines whether or not a name of a composite substance of the sample SP has been estimated based on a plurality of substances estimated by the substance estimator 216*b*, at least one of an order in which the plurality of substances are estimated and analysis depths thereof, and the composite substance library LiM read by the library reader 225 in step S2509. The control process proceeds to step S2510 in the case of YES in this determination, and the control process proceeds to step S2511 in the case of NO. In step S2510, the name of the composite substance estimated in step S2509 is displayed on the display 22.

In step S2511, the input receiver 221*b* determines whether or not an operation for performing additional analysis has been performed. In a case where information in the depth direction is insufficient, it is possible to enhance the possibility that the composite substance can be estimated by the additional analysis. The process returns to step S2504 to execute the component analysis again in the case of YES in this determination, and the control process proceeds to step S2512 in the case of NO.

In step S2512, the input receiver 221*b* determines whether or not an operation for registering a new name of a composite substance in the composite substance library LiM has been performed. The control process proceeds to step S2513 in the case of YES in this determination, and the analysis is ended in the case of NO.

In step S2513, the input receiver 221*b* receives an input of the name of the composite substance to be registered in the composite substance library LiM. Then, the composite substance registering section 218 registers the name of the composite substance received by the input receiver 221*b* in the composite substance library LiM in association with substances at a plurality of analysis depths estimated by the substance estimator 216*b*. In step S2514, the display controller 221*a* causes the display 22 to display the name of the composite substance registered in step S2512.

The analysis in the depth direction of the sample SP is performed through the above steps S2501 to S2514.

<User Interface of Drilling Analysis>

Figure 16A:
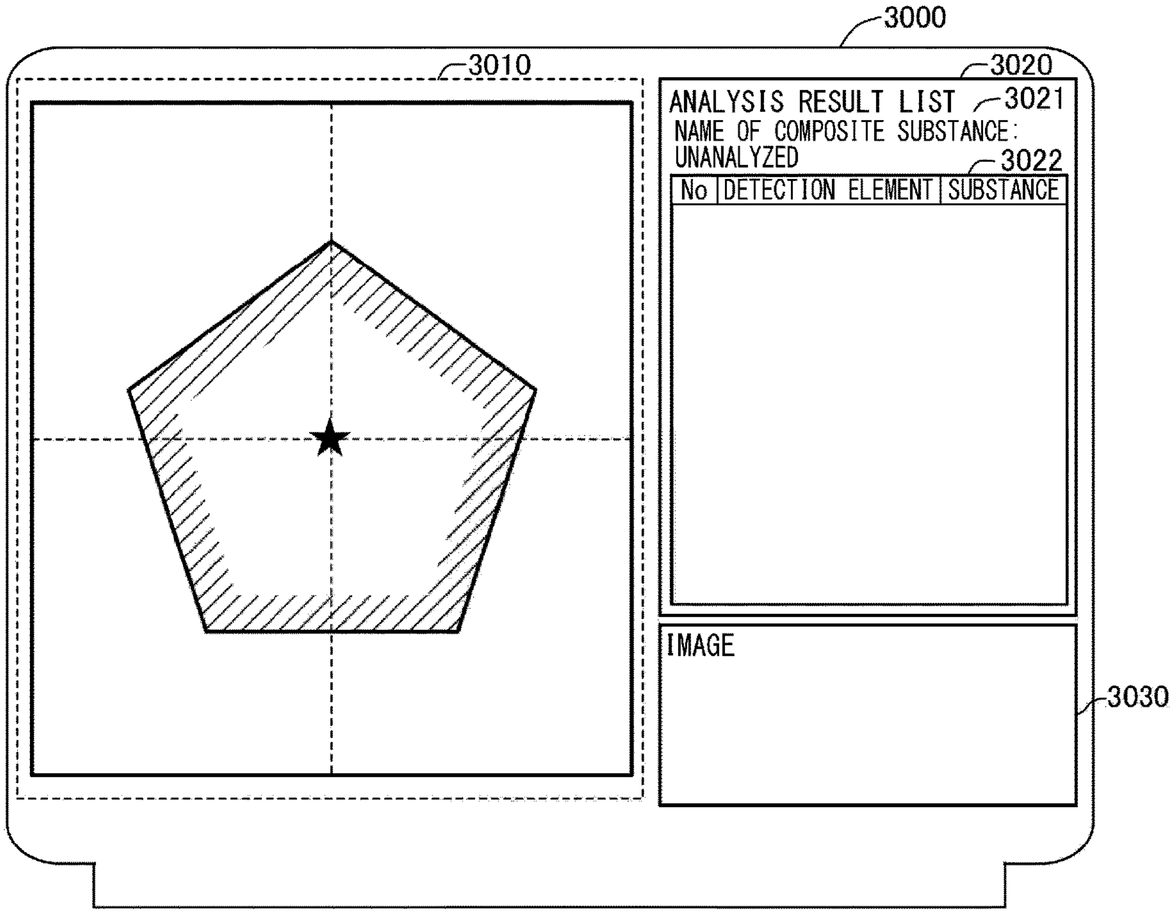
FIG. 16A is a view illustrating a display screen of a display.
Figure 16B:
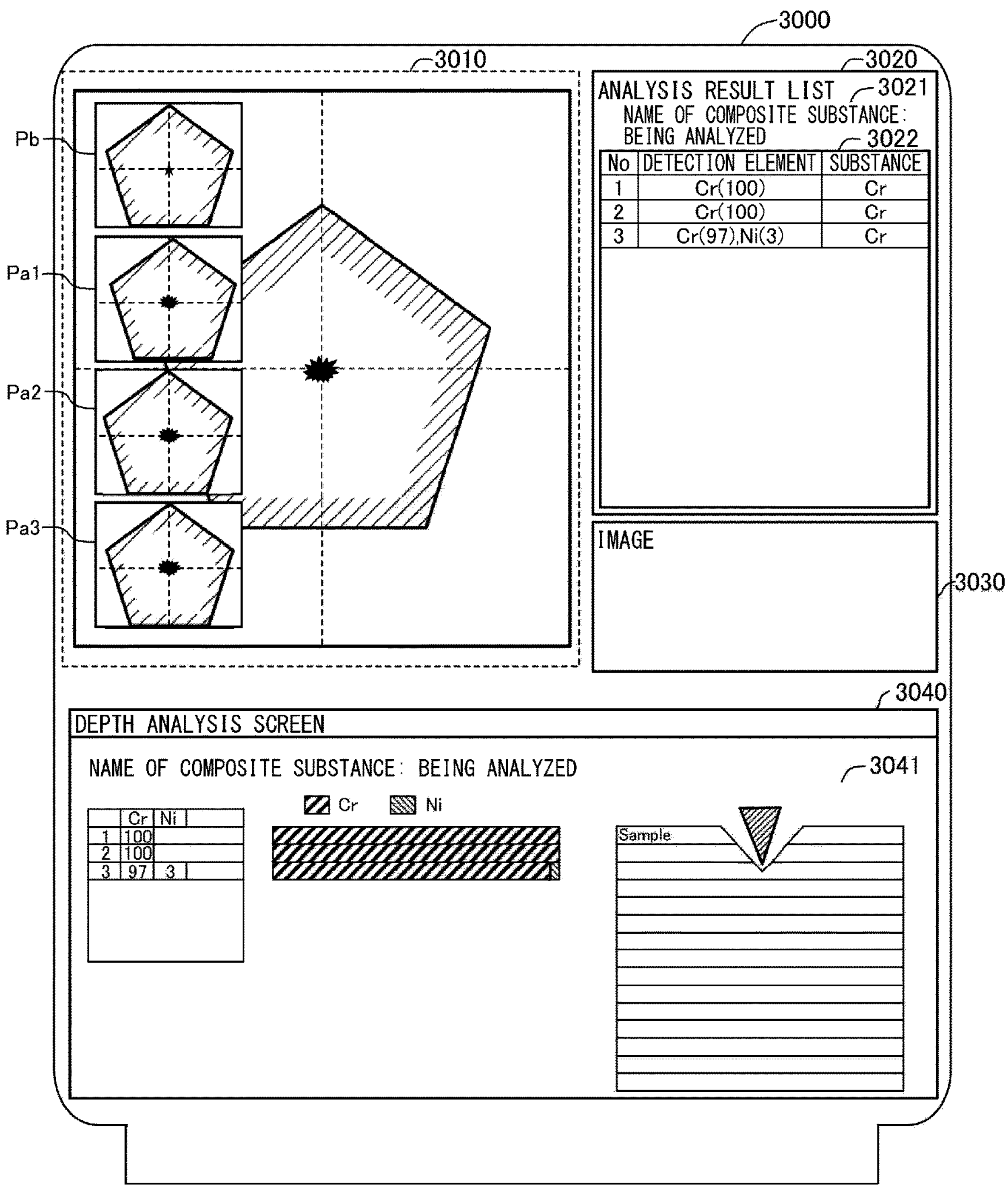
FIG. 16B is a view illustrating the display screen of the display.
Figure 16C:
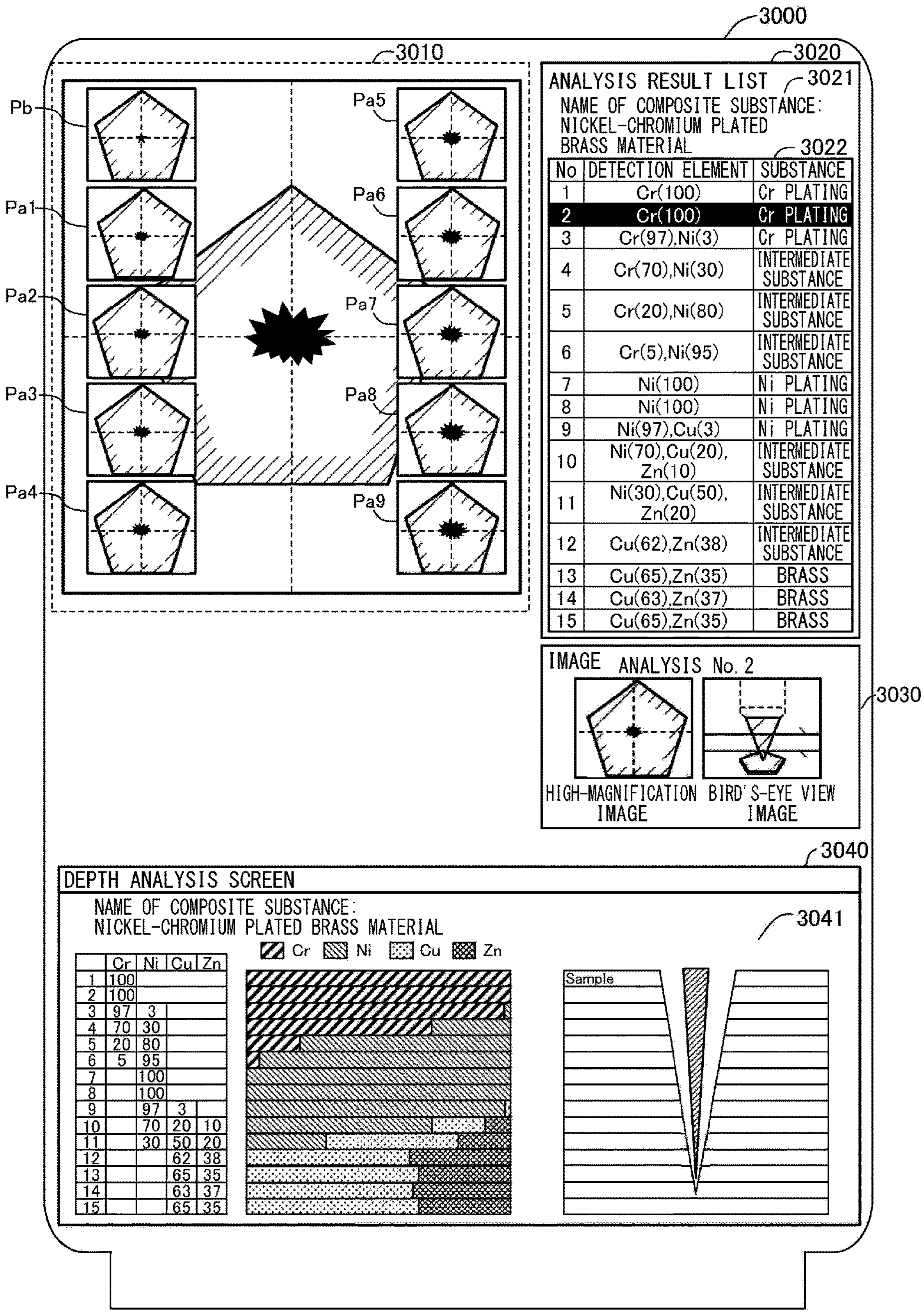
FIG. 16C is a view illustrating the display screen of the display.

FIGS. 16A to 16C are views illustrating examples of a drilling screen 3000 configured to display a result of the drilling analysis.

FIG. 16A is the view illustrating the drilling screen 3000 before the sample SP is irradiated with laser light. The drilling screen 3000 has an image display area 3010, a result display area 3020, and a related image display area 3030.

The image display area 3010 is an area for displaying the image P of the sample SP. The image display area 3010 can display the image P obtained by capturing the sample SP with the first camera 81 provided in the analysis housing that accommodates the analysis optical system. Further, a live image obtained by updating the image P of the sample SP captured by the first camera 81 in real time can also be displayed in the image display area 3010 in this case. When the live image of the sample SP is displayed, the user can easily grasp which position of the sample is to be analyzed.

Further, position information indicating a visual field center can be superimposed and displayed on the live image of the sample SP displayed in the image display area 3010. The position information may be superimposed and displayed by superimposing a cross line having the visual field center as an intersection on the image of the sample SP or by superimposing an arbitrary mark at a position corresponding to the visual field center.

The result display area 3020 is an area for displaying a component analysis result obtained by the component analysis section 216 and a composite substance estimation result obtained by the composite substance estimator 217, and includes an estimated composite substance display area 3021 to display the composite substance estimation result obtained by the composite substance estimator 217 and a component analysis result display area 3022 to display the component analysis result obtained by the component analysis section 216.

FIG. 16A is the view illustrating the drilling screen 3000 before analysis. Therefore, "unanalyzed" indicating the state before analysis is displayed in the estimated composite substance display area 3021 in the example illustrated in FIG. 16A. Further, there is no component analysis result displayed in the component analysis result display area 3022.

The related image display area 3030 is an area for displaying the image P stored in association with one component analysis result. As described above, the image P such as the wide-area image, the pre-irradiation image Pb, the post-irradiation image Pa, and the bird's-eye view image Pf can be associated with one component analysis result. The display controller 221*a* can display these associated images P in the related image display area 3030. The example illustrated in FIG. 16A there is no related image displayed in the related image display area 3030 because the state is before analysis.

FIG. 16B is the view illustrating the drilling screen 3000 after the sample SP is irradiated with laser light three times.

In the image display area 3010, the pre-irradiation image Pb of the sample SP and post-irradiation images Pa1, Pa2, and Pa3 after the first, second, and third laser light irradiation are superimposed on a live image of the sample SP and displayed. As the pre-irradiation image Pb and the post-irradiation images Pa displayed here, those obtained by displaying the periphery of an analysis point in an enlarged manner may be used. As a result, a color, a shape, and the like of the periphery of the analysis point can be confirmed in more detail.

In the drilling setting, whether or not to acquire a pre-irradiation image can be selected by selecting the check box CB35. In a case where it has been set to acquire the pre-irradiation image by selecting the check box CB15, the imaging processor 213 generates the image P of the sample SP before emission of laser light from the emitter 71. The pre-irradiation image Pb thus obtained is superimposed and displayed on the image display area 3010.

Further, in a case where it has been set to acquire an image for each irradiation by selecting the check box CB36, the imaging processor 213 can generate the image of the sample SP every time the laser light is emitted from the emitter 71, and display the post-irradiation image Pa thus obtained to be superimposed on the image display area 3010.

A depth analysis window 3040 is a screen indicating which element is present at which ratio in the depth direction of the sample SP. Details of the depth analysis window 3040 will be described later.

The example illustrated in FIG. 16B is a state where the sample SP has been irradiated with laser light, which is an electromagnetic wave, three times, and the component analysis of the sample SP is not completed. Therefore, the display controller 221*a* causes the estimated composite substance display area 3021 to display the display of "being analyzed" in the middle of the component analysis. Further, the component analysis result display area 3022 displays the component analysis result obtained by the component analysis section 216 by irradiating the sample SP with the laser light and the substance estimated by the substance estimator 216*b*. Note that information for identifying a substance may be displayed in the component analysis result display area 3022 instead of the substance estimated by the substance estimator 216*b* or in addition to the substance. Here, examples of the information for identifying the substance include the superclass, the intermediate class, and the like of the substance. That is, a common name, a general term, and the like of the substance estimated by the substance estimator 216*b* are included. That is, when the substance estimator 216*b* estimates that the substance is the SUS300 series, information such as austenitic stainless steel, stainless steel, and alloy corresponds to the information for identifying the substance.

FIG. 16C is the view illustrating a state where a plurality of positions having different analysis depths of the sample SP have been irradiated with laser light and analysis is completed. This example is an example of a case where fifteen times is input in the number-of-times-of-continuousemission input field 2003 as the number of times of continuous emission. Further, the change start threshold and the change completion threshold are as described with reference to FIG. 22, and it is assumed that the check box CB32 for selecting whether or not to stop the analysis when a change in a substance is completed is not selected.

In the image display area 3010, the pre-irradiation image Pb of the sample SP and post-irradiation images Pa1, Pb2, and so on are displayed. Although only nine post-irradiation images Pa1 to Pa9 are displayed in FIG. 16C due to space limitations, all the post-irradiation images Pa may be displayed by moving a cursor in the vertical or left/right direction, zooming out an image, or the like.

Further, the characteristic Ch estimated by the characteristic estimator 216*a* is displayed in the depth direction of the sample SP on the depth analysis window 3040. As a result, it is possible to grasp types of elements constituting the characteristic and how contents of the elements are distributed from the surface to the underlayer of the sample SP.

The estimated composite substance display area 3021 displays the composite substance estimated by the composite substance estimator 217 based on results of the component analysis performed fifteen times and the composite substance library LiM. From the surface to the underlayer of the sample SP, Cr, Ni, and brass change in this order. Therefore, the composite substance estimator 217 estimates that a name of the composite substance of the sample SP is a nickel chromium plated brass material, and the display controller 221*a* displays the "nickel chromium plated brass material" in the estimated composite substance display area 301.

The component analysis result display area 3022 displays the component analysis result obtained by the component analysis section 216 every time the sample SP is irradiated with the laser light. Each component analysis result includes constituent elements constituting the characteristic Ch estimated by the characteristic estimator 216*a*, contents of the elements, and substances estimated by the substance estimator 216*b*. As a result, it is possible to grasp how the characteristic Ch constituting the sample SP changes at a plurality of positions having different analysis depths.

Here, depth information indicating the analysis depth calculated by the imaging processor 213 may be displayed on at least one of the depth analysis window 3040 and the component analysis result display area 3022. As a result, it is possible to more accurately grasp which depth of the sample has been analyzed to obtain the result.

An image associated with one component analysis result can be displayed in the related image display area 3030. In the example illustrated in FIG. 16C, the component analysis result of No. 2 is selected by the user as one component analysis result. When the input receiver 221*b* receives selection of one component analysis result, the display controller 221*a* displays an image associated with the one component analysis result on the display 22. In this example, the post-irradiation image Pa2, which is a high-magnification image of the sample SP stored in association with the component analysis result of No. 2, and the bird's-eye view image Pf are displayed.

<Depth analysis window 3040>

The depth analysis window 3040 will be described with reference to FIG. 16C.

In the drilling which is the analysis in the depth direction of the sample SP, a crater-like hole is generated at an analysis point every time the sample SP is irradiated with laser light which is an electromagnetic wave. As a result, the sample SP can be dug in the depth direction, and substances at different analysis depths can be estimated.

The depth analysis window 3040 is a window for displaying types of elements present at the different analysis depths and contents of the elements in a depth order of the analysis depth.

As the sample SP is irradiated with laser light, the sample SP is sequentially dug from the surface irradiated with the laser light. Therefore, in a case where substantially the same analysis point is repeatedly irradiated with the laser light, a deeper point from the surface of the sample SP is irradiated with the laser light as the number of times of emission of the laser light increases. Therefore, there is a positive correlation between the number of times of emission of the laser light and the analysis depth.

Then, as a plurality of component analysis results obtained by irradiating the sample SP with the laser light are aligned from the top to the bottom of the display 22 in the order in which the component analysis results are obtained, the vertical direction of the display corresponds to the depth direction of the analysis. In this manner, it is possible to intuitively grasp types of elements constituting a characteristic and how contents of the elements are distributed from the surface to the underlayer of the sample SP.

The component analysis result obtained by irradiating the sample SP with the laser light for the first time is Cr: 100%. This is displayed at a predetermined position of the depth analysis window 3040 in a table format and a graph format.

Next, the component analysis result obtained by irradiating the sample SP with the laser light for the second time is Cr: 100% which is similar to that of the first time. This is displayed below the component analysis result of the first time on the depth analysis window 3040. Similarly, the component analysis results of the third and subsequent times are also displayed below the component analysis results of the second time, the third time, and so on which are the immediately previous component analysis results, respectively.

As a result, the component analysis results are displayed in a table format and a graph format from top to bottom. As described above, the component analysis result of the first time corresponds to a component analysis result of the surface of the sample SP, and a component analysis result corresponds to a component analysis result of the underlayer of the sample SP as the number of times of irradiation of the laser light increases. Therefore, displaying the component analysis results from top to bottom in the irradiation order of the laser light refers to displaying the component analysis results in the analysis depth order of the sample SP.

The depth analysis window 3040 can also display the name of the composite substance of the sample SP estimated by the composite substance estimator 217. As a result, it is possible to easily grasp what kind of composite substance the sample SP is.

since the component analysis results are displayed in the vertical direction of the display 22 in the analysis depth order in this manner, it is possible to display the component analysis results as if the sample SP is viewed in a cross section. Since the depth direction of the sample SP corresponds to the vertical direction of the display 22, it is possible to intuitively grasp how the substance changes from the surface to the underlayer of the sample SP, and thus, it is possible to improve the usability.

Further, the depth analysis window 3040 can display an analysis depth drawing screen 3041 intuitively indicating which depth of the sample SP is being analyzed.

The sample SP is dug in the depth direction by repeatedly irradiating the sample SP with the laser light. As the analysis depth drawing screen 3041 indicating which depth of the sample SP is being analyzed is displayed in association with the aligning of the plurality of component analysis results obtained by irradiating the sample SP with the laser light from the top to the bottom of the display 22 in the order in which the component analysis results are obtained, it is possible to more simply and intuitively grasp types of elements constituting a characteristic and how contents of the elements are distributed from the surface to the underlayer of the sample SP.

<Measurement of Analysis Depth>

In the present embodiment, it is also possible to measure an analysis depth by executing autofocus before irradiation of the sample SP with laser light or after the irradiation. Although details are omitted, a distance from the head to a laser irradiation point of the sample SP can be measured by executing generation of the image P by the first camera 81 while changing a relative distance between the sample SP and the head 6. The analysis depth can be displayed in the analysis depth drawing screen 3041 based on the distance measured here. As a result, types of elements constituting a characteristic and the distribution of contents of the elements can be displayed based on the actual depths, and thus, the analysis result of the sample SP can be more accurately evaluated.

Further, since the analysis depth is measured before the irradiation of the sample SP with the laser light and after the irradiation, a thickness (width in the depth direction) at which one substance is distributed can also be estimated. The composite substance estimator 217 can also estimate a name with a high accuracy as the name of the composite substance of the sample SP based on this thickness.

As described above, the laser-induced breakdown spectroscope according to the present invention can be used when various samples are analyzed.

What is claimed is:

1. A laser-induced breakdown spectroscope, which performs component analysis of an analyte in a depth direction of the analyte using laser induced breakdown spectroscopy, the laser-induced breakdown spectroscope comprising:

an emitter that emits laser light to the analyte;

a collection head that collects plasma light generated on the analyte by irradiating the analyte with the laser light emitted from the emitter;

a detector that receives the plasma light generated on the analyte and collected by the collection head, and generates a spectrum which is an intensity distribution of the plasma light for each wavelength;

a library holding section that holds a substance library including a plurality of constituent elements constituting a plurality of substances and a content of the plurality of constituent elements as an information for identifying each of the plurality of substances;

a component analysis section that estimates constituent elements constituting the analyte and a content of the constituent elements based on the spectrum generated by the detector, and estimates a substance contained in the analyte based on the estimated constituent elements, the estimated content of the constituent elements and the substance library held in the library holding section; and a display controller that causes a display to display the constituent elements and the content of the constituent elements, estimated by the component analysis section, and the information for identifying the substance, wherein the emitter emits the laser light to a same analysis point of the analyte a plurality of times to irradiate a plurality of positions having different analysis depths with the laser light, the component analysis section executes estimation of the constituent elements constituting the analyte and the content of the constituent elements and estimation of the substance contained in the analyte at each of the plurality of positions having the different analysis depths, and the display controller causes the display to display a depth analysis window indicating the constituent elements and the contents of the constituent elements at the plurality of positions having the different analysis depths, estimated by the component analysis section, and the information for identifying the substance corresponding to the substance contained in the analyte estimated by the component analysis section, along the different analysis depths and aligned from top to bottom of the display for the different analysis depths from a surface to a lower layer of the analyte.

2. The laser-induced breakdown spectroscope according to claim 1, wherein the component analysis section collates the constituent elements constituting the analyte and the content of the constituent elements with the substance library held in the library holding section at each of the plurality of positions having the different analysis depths, and estimates that the substance is an intermediate substance that is changing from one substance to another substance when a matching degree between a constituent element of one substance of the plurality of substances included in the substance library and a content of the constituent element of the one substance of the plurality of substances included in the substance library and a constituent element constituting the analyte and a content of the constituent element constituting the analyte is equal to or less than a predetermined threshold for each of the plurality of substances included in the substance library.

3. The laser-induced breakdown spectroscope according to claim 1, wherein the estimation of the substance contained in the analyte at each of the plurality of positions having the different analysis depths is at least a substance at a first analysis depth and a substance at a second analysis depth, the component analysis section estimates that the substance at the second analysis depth is an intermediate substance that is changing from the substance at the first analysis depth to a different substance when a content of one constituent element at the first analysis depth is different from a content of the one constituent element at the second analysis depth, deeper than the first analysis depth, by a predetermined threshold or more, and the display controller causes the display to display a fact that the substance at the second analysis depth is the intermediate substance when the component analysis section estimates that the substance at the second analysis depth is the intermediate substance.

4. The laser-induced breakdown spectroscope according to claim 1, wherein the estimation of the substance contained in the analyte at each of the plurality of positions having the different analysis depths is at least a substance at a first analysis depth and a substance at a second analysis depth, the component analysis section estimates that a change from the substance at the first analysis depth to a different substance has started when a content of one constituent element at the first analysis depth is different from a content of the one constituent element at the second analysis depth, deeper than the first analysis depth, by a predetermined threshold or more, and the display controller causes the display to display the substance at the first analysis depth as the substance at the second analysis depth when the start of the change to the different substance is estimated by the component analysis section.

5. The laser-induced breakdown spectroscope according to claim 3, further comprising:

an analysis setting section that receives a setting of a number of times of emission of the laser light; and an emission controller that controls the emission of the laser light performed by the emitter, wherein the emission controller generates an emission permission signal for permitting the emitter to emit the laser light when a number of times of emission of the laser light after a start of analysis based on a setting set by the analysis setting section is less than the number of times of emission set by the analysis setting section.

6. The laser-induced breakdown spectroscope according to claim 5, wherein the component analysis section estimates that the change from the substance at the first analysis depth to the different substance is completed when substances estimated at a plurality of analysis depths, deeper than the second analysis depth, are continuously identical, and generates a stop signal for causing the emission controller to stop the emission of the laser light when the number of times of emission of the laser light after the start of analysis based on the setting set by the analysis setting section is less than a number of times of emission set by the analysis setting section at a time point when the estimation has been made.

7. The laser-induced breakdown spectroscope according to claim 1, further comprising a composite substance estimator that estimates a name of a composite substance of the analyte based on substances estimated at each of the plurality of positions having the different analysis depths and a composite substance library held in the library holding section, wherein the library holding section further holds the composite substance library in which a name of a composite substance is associated with configuration information of a plurality of substances constituting the composite substance.

8. The laser-induced breakdown spectroscope according to claim 7, further comprising:

a camera that receives reflection light reflected by the analyte placed on a placement stage; and an imaging processor that generates an image of the analyte based on the reflection light received by the camera, wherein the library holding section holds the composite substance library further associated with the name of a composite substance depth information of the plurality of substances constituting the composite substance, the imaging processor calculates the analysis depth based on a plurality of the images having different relative distances between the camera and the analyte, and the composite substance estimator estimates the name of the composite substance of the analyte based on the substance estimated at each of the plurality of positions having the different analysis depths, the analysis depth calculated by the imaging processor, and the composite substance library held in the library holding section.

9. The laser-induced breakdown spectroscope according to claim 7, wherein the display controller causes the name of the composite substance of the analyte estimated by the composite substance estimator to be displayed on the depth analysis window.

10. The laser-induced breakdown spectroscope according to claim 1, further comprising:

a camera that receives reflection light reflected by the analyte; and an imaging processor that generates an image of the analyte based on the reflection light received by the camera, wherein the imaging processor sequentially generates the image of the analyte whenever the component analysis of the analyte is performed, and the display controller causes the display to display a plurality of the images sequentially generated whenever the component analysis of the analyte is performed.

11. The laser-induced breakdown spectroscope according to claim 1, wherein on the depth analysis window, constituent elements constituting the substance, contents of the constituent elements, and the information for identifying the substance are aligned in a vertical direction of the display in an order of the analysis depth.

12. The laser-induced breakdown spectroscope according to claim 1, wherein the display controller causes the display to display the constituent elements and the contents of the constituent elements in at least one of a table format and a graph format as the depth analysis window.

* * * * *